(12) United States Patent
Konstantinides et al.

(10) Patent No.: US 11,216,879 B1
(45) Date of Patent: *Jan. 4, 2022

(54) SYSTEM AND METHOD FOR DISPLAYING ORDER STATUS AND RECEIVING AND CHANGING ORDERS

(71) Applicant: Charles Schwab & Co., Inc., San Francisco, CA (US)

(72) Inventors: Konstantinos P. Konstantinides, Martinez, CA (US); Martin P. Wright, Oakland, CA (US); Eliel R. Johnson, San Francisco, CA (US)

(73) Assignee: Charles Schwab & Co., Inc., Southlake, TX (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/596,491

(22) Filed: Oct. 8, 2019

Related U.S. Application Data

(63) Continuation of application No. 14/216,830, filed on Mar. 17, 2014, now Pat. No. 10,438,285.

(60) Provisional application No. 61/802,148, filed on Mar. 15, 2013.

(51) Int. Cl.
G06Q 40/04 (2012.01)
G06Q 30/08 (2012.01)

(52) U.S. Cl.
CPC .............. *G06Q 40/04* (2013.01); *G06Q 30/08* (2013.01)

(58) Field of Classification Search
None
See application file for complete search history.

(56) References Cited

U.S. PATENT DOCUMENTS

2012/0136771 A1* 5/2012 Peebler .................. 715/774

FOREIGN PATENT DOCUMENTS

WO    WO-2008/060900 A2 * 5/2008 ........... G06F 40/103

* cited by examiner

*Primary Examiner* — Alexander G Kalinowski
*Assistant Examiner* — Blane A Lickteig
(74) *Attorney, Agent, or Firm* — Innovation Partners; Charles Gotlieb

(57) ABSTRACT

A system and method graphically displays and receives order status and allows order status to be replayed in time.

15 Claims, 7 Drawing Sheets

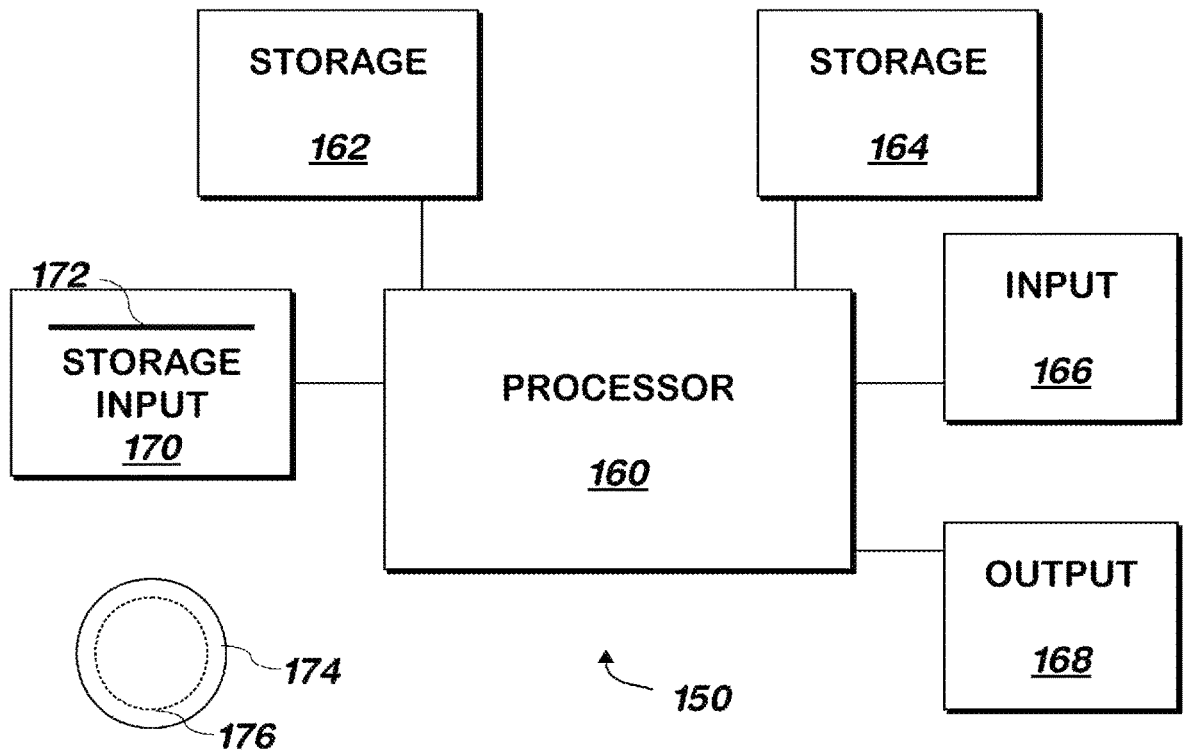

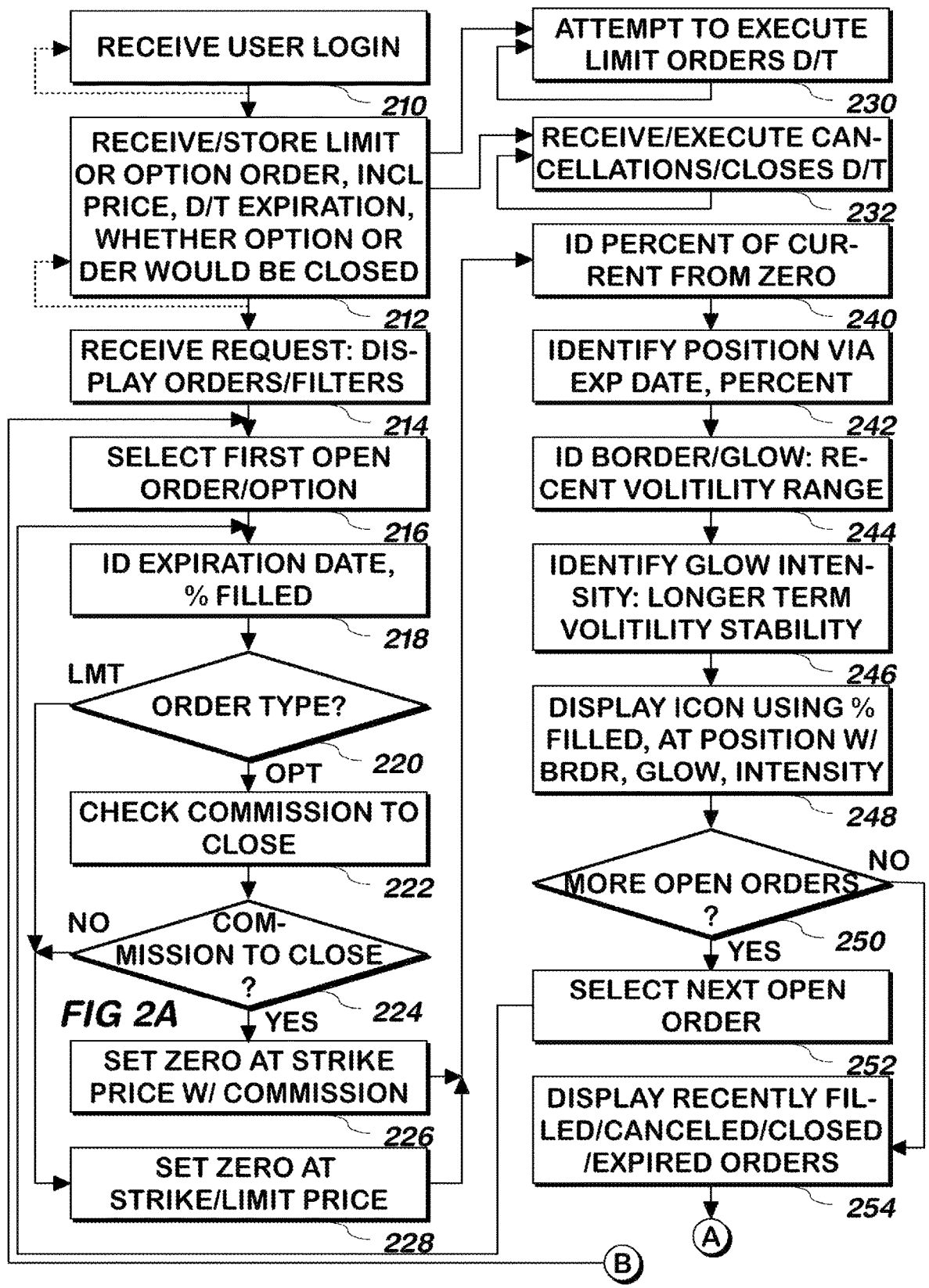

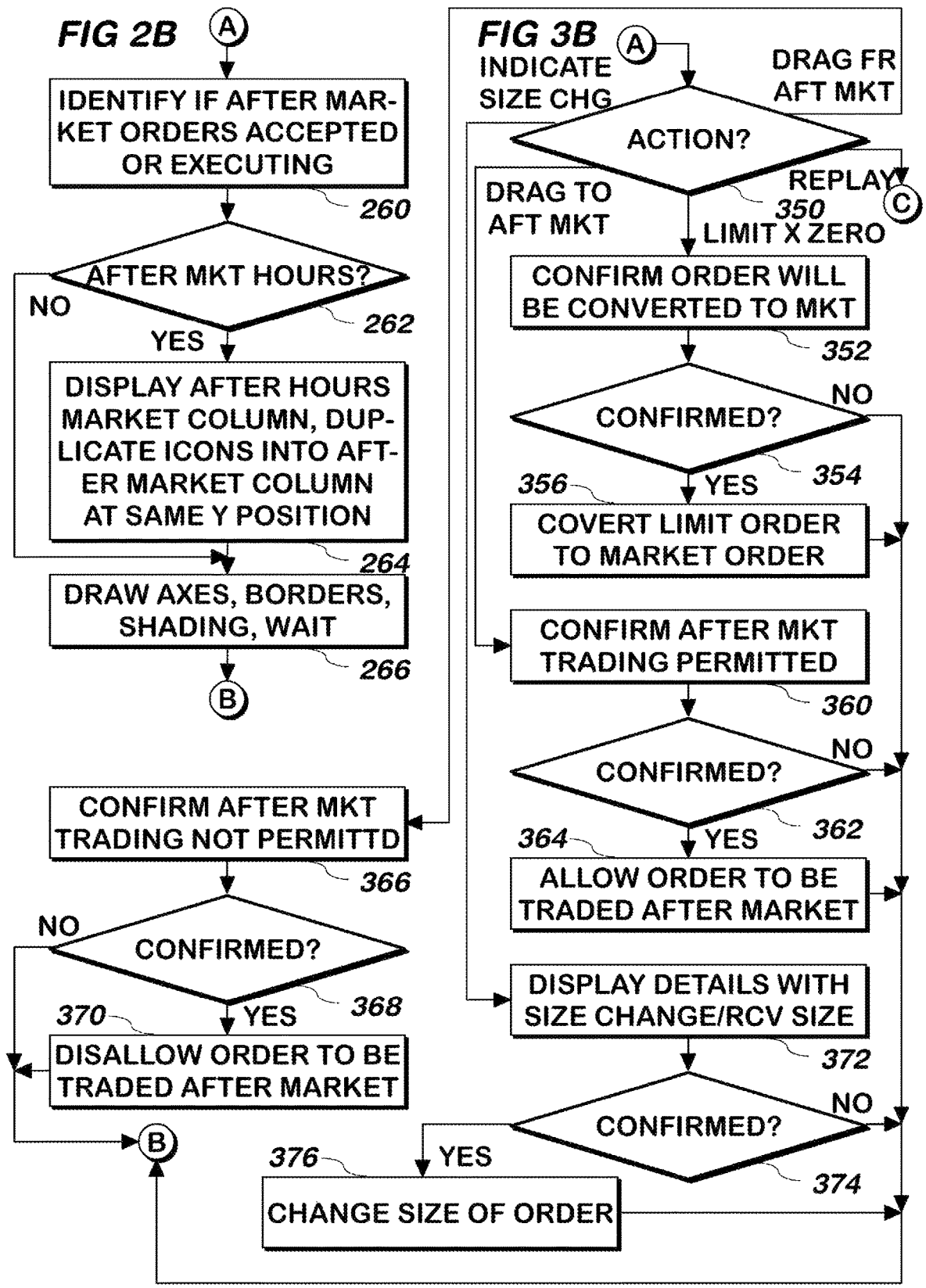

SYSTEM AND METHOD FOR DISPLAYING ORDER STATUS AND RECEIVING AND CHANGING ORDERS

RELATED APPLICATIONS

This application is a continuation of U.S. patent application Ser. No. 14/216,830 entitled "System and Method for Displaying Order Status and Receiving and Changing Orders" by Konstantinos P. Konstantinides, Martin P. Wright and Eliel R. Johnson on Mar. 17, 2014, which claims the benefit of U.S. Provisional Patent Application Ser. No. 61/802,148 entitled, "Method and Apparatus for Displaying Order Status and Receiving and Changing Orders" filed on Mar. 15, 2013 by Konstantinos P. Konstantinides, Martin P. Wright and Eliel R. Johnson, each having the same assignee as the present application, and each is hereby incorporated by reference in its entirety.

FIELD OF THE INVENTION

The present invention is related to computer software and more specifically to computer software for making, changing, and displaying the status of, securities orders.

BACKGROUND OF THE INVENTION

Entities may purchase stocks or other securities using one or more brokerage accounts to which they may log in using a single log in to a financial institution web site or application. Entities may also provide orders that are contingent on an event occurring before a transaction involving the underlying securities occurs. For example, the user of a financial services web site or application may provide a limit order that requires the share price of the security specified in the order to reach or cross over a specified limit price before the shares corresponding to the limit order are bought or sold.

Another type of order is an option order. An option only causes the sale or purchase of underlying shares that correspond to the option in the event that the market price is more favorable for the buyer of the option than the strike price of the option.

Current methods of viewing order status are suboptimal. What is needed is a system and method for viewing order status.

SUMMARY OF INVENTION

A system and method allows a user log into one or more accounts at a financial institution and view, place, modify or cancel orders by making gestures, such as by dragging or resizing an icon. Open orders, ones that have not been canceled or expired, are filled, if the limit price on a limit order can be achieved before the expiration date, or if the market price is more favorable to the buyer of an option than the strike price at the expiration date. At the expiration date, orders not filed are considered to be expired and may not be filled.

A user may place orders by searching for a security, or by viewing positions that user holds in any security (including options and limit orders that have not yet expired), and then viewing available orders corresponding to the search results. Available orders may be sorted in an order that corresponds to the relevance of the order to the user, which may be identified based on any or all of the popularity of a certain type of order, how close the expiration date is, how close the strike price is to the market price, and any holdings in the account or accounts to which the user logged in, for example, by displaying in a list of available orders, a limit order to sell shares in a security above one to buy shares in that security if the user already owns such shares of that security. Option orders may be ordered in the list according to positions the user holds in the underlying security for the options, for example by first listing options to sell calls covered by shares the user already owns before listing other types of option orders if the user owns a security searched or listed in a position.

A list of titles of the available orders may be displayed in one of several panes of a display screen, for example, a left most pane. To place an order, the user may use a gesture, such as to drag a title from that pane into a different pane, for example, a center pane, that displays any of the user's other open orders. The center pane may have an X-axis and a Y-axis. The X-axis indicates the number of days until expiration of the order, with 0-1 days being to the rightmost position, and the Y-axis may indicate the percentage the strike price (as used herein, the limit price of a limit order is considered to be its "strike price") relative to the price of the underlying security (e.g. the security in a limit order or the security that is bought or sold if an option is exercised). The user may release the dragged title to the center pane, and a details box will appear next to an icon, such as a rectangular shaped tile that appears on the screen. The details box identifies the underlying security, expiration date, number of shares, strike price and the user may change any of the details or specify a different underlying security and confirm the order. Such details may be prefilled based on the location at which the mouse cursor was released (e.g. the expiration date of a limit order may be prefilled to the center of the X-axis range in which it was released), positions the user has in the security (a limit order to sell a security may be prefilled with the total number of shares held by the user or highest number of shares held in any one account of the user), default values or otherwise or certain details may be omitted until the user explicitly provides them. The details box may also indicate the market price of the underlying security, the commission and price of any option, and the ticker symbol of an option. Once confirmed, the order is placed for the user's account. If the user has more than one account, a default account whose name or identifier is displayed in the details box may be used unless changed in the details box by the user to a different account owned or managed by the user who logged in.

The user views orders, including open orders and those recently closed or expired, via icons that have are titled to indicate the name of the underlying security and the type of order. Any orders partially filled may be indicated by displaying the percentage filled and percentage unfilled in two different colors, so for example, for a half-filled order, half the icon is displayed in one color and half in another. The icons appear on the X and Y axes described above in accordance with their expiration dates and percent above or below market of the strike price (including the limit price of a limit order).

The rightmost part of the middle pane may display an additional set of information (with the X-axis and the remaining information shifted left and the scale of the X-axis changed to accommodate the smaller remaining area in which it is displayed) that duplicates icons corresponding to orders that may be filled in after-hours trading, with a Y-axis position the same as the icon being duplicated. In one embodiment, the additional information is only displayed during the times after hours markets are open or orders are being accepted in such markets.

A rightmost pane may display icons corresponding to recently filled, recently canceled and recently expired orders. In one embodiment, no more than a threshold number of such orders are displayed, and the threshold number displayed may be selected from orders using not just the most recent of such three types of orders, but using a rule to promote the display of an older order of one of the three types over one not displayed from a different type in order to promote a diversity of displayed types. For example, if the threshold number would be reached with only recently canceled orders, an older expired order may be displayed with one less than the threshold number of the most recently canceled orders to allow at least one other type to be displayed.

Gestures may also be used to perform other actions on orders. For example, an order may be canceled by dragging the icon representing it from the center pane to the rightmost pane. An order may be modified in price or expiration date by dragging the icon representing it in the center pane side to side to change the expiration date or up or down to change the strike price. If the icon is dragged across the Y=0 line, a limit order may be converted to a market order.

In one embodiment, a user may indicate a change in size (i.e. number of shares of the underlying security) of an order by dragging an edge or corner of the icon away from the center of that icon. The size of the order may be set in response to the size of the icon when the user lets go of the dragged edge or corner and the change may be confirmed or changed, or any drag of a corner or edge may cause a display of the details of the order that the user can then change to change the size of the order.

Once confirmed, an order is placed or change is made to the order. In the case of an option order, if a change is made, the prior option is unwound using conventional methods, for example, by performing the opposite transaction (if calls were purchased they are sold, or if calls were purchased, puts at the same strike price, expiration date and number of shares are purchased) and then the newly desired option may be bought or sold, unless the change is the amount, in which case additional options are purchased or sold or a difference amount of options are unwound.

Thus, orders may be placed, changed or canceled graphically via a display and input device on the user's device and order status is updated rapidly when there are changes to orders or prices.

BRIEF DESCRIPTION OF THE DRAWINGS

FIG. 1 is a block schematic diagram of a conventional computer system.

FIG. 2, consisting of FIGS. 2A and 2B, is a flowchart illustrating a method of receiving orders, and changes to orders, and displaying order status according to one embodiment of the present invention.

DETAILED DESCRIPTION OF A PREFERRED EMBODIMENT

Figure 3A:
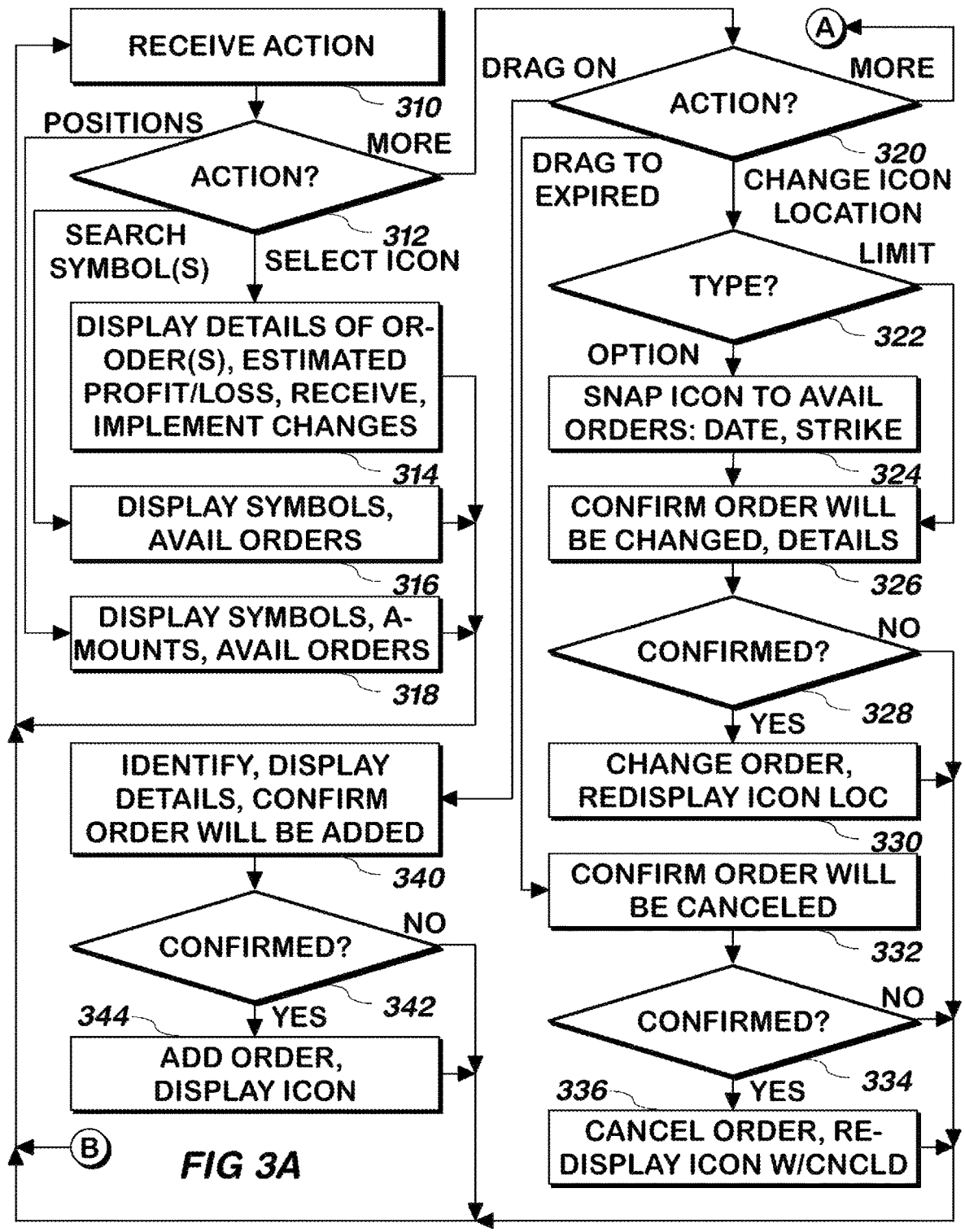
FIG. 3, consisting of FIGS. 3A, 3B and 3C, is a flowchart illustrating a method of receiving and changing orders according to one embodiment of the present invention.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. All storage elements listed herein may include memory or disk storage and may include a conventional database. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below. All elements identified as storage may include memory or disk storage and may include a conventional database.

In one embodiment, each computer system 150 is a conventional Sun Microsystems T SERIES SERVER running the Solaris operating system commercially available from ORACLE CORPORATION of Redwood Shores, Calif., a Pentium-compatible personal computer system such as are available from Dell Computer Corporation of Round Rock, Tex. running a version of the Windows operating system (such as XP, VISTA, or 7) commercially available from Microsoft Corporation of Redmond Wash. or a Macintosh computer system running the MacOS or OpenStep operating system commercially available from Apple Incorporated of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY *NEXUS* III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

FIG. 2, consisting of FIGS. 2A and 2B, is a flowchart illustrating a method for using icons to display information corresponding to securities orders according to one embodiment of the present invention.

Figure 2C:
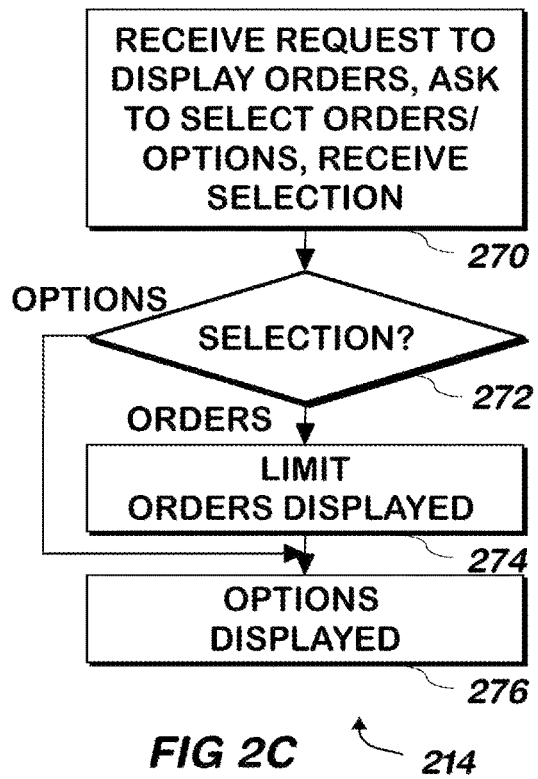
FIG. 2C describes step 214 of FIG. 2A in more detail and is a flowchart illustrating a method of displaying limit orders or options according to one embodiment of the present invention.

FIG. 2C describes step 214 of FIG. 2A in more detail and illustrates a method of displaying limit orders or options according to one embodiment of the present invention.

Receive User Log In.

Referring now to FIGS. 2A and 2B, log in information is received 210 from a user. Log in information, including a user identifier and corresponding password, may be received in any conventional manner of receiving log in information, and an attempt to authenticate any such log in information received may be made using conventional log in authentication techniques. In one embodiment, user log in information may be associated with one or more conventional brokerage accounts held by a user at a conventional brokerage firm, and any number of capabilities corresponding to such brokerage account or accounts, such as the ability to purchase and/or sell securities using such accounts, may also be associated with the log in information. Securities orders indicated by the user, including market orders, limit orders, and call option or put option orders, may be made and executed on behalf of the user as described in more detail below using one or more of such associated brokerage accounts. In one embodiment, when an indication to place or execute a securities order is received from the user, as described in more detail below, suitable user interface elements may be provided to the user (e.g. a drop-down menu may be displayed) to allow the user to specify, from a list of the one or more brokerage accounts associated with the user's log in information, the specific account to use to place or execute such order indicated. A default user account may be used if none is specified.

Log in information corresponding to any number of users may be received at any time, and the process of receiving log in information may be an independently operating process as shown by the dashed line in the Figure.

Receive/Store Limit or Option Order, Including Price, Expiration, Whether Option Order Would Be Closed.

Any number of securities orders, including limit orders and/or option orders, may be received from the user at any time, and any such received orders are stored corresponding to the user's brokerage account or accounts 212. In one embodiment, a limit order, including a limit price referred to herein as a strike price, and expiration date, may be an order to purchase a specified number of shares of a specified security at the specified strike price, or it may be an order to sell such security shares at the strike price, and the strike price corresponding to any limit order may be a minimum or a maximum strike price. If the strike price corresponding to a limit order is a maximum, then the security shares specified by the limit order may be purchased or sold only if the open market price of the security reaches the strike price or goes below the maximum strike price. If the strike price is a minimum strike price, then security shares may be purchased or sold only if the security is priced at or above the strike price on the open market. When the strike price of a security corresponding to a limit order is reached on the open market, the limit order is executed, or partially executed, according to the specifications of such limit order.

In one embodiment, a limit order may be specified as an all-or-nothing limit order, in which case the total number of shares specified by the limit order must be available to purchase or be sold at the specified strike price in order for the order to be executed, or the limit order may be specified as a maximum order, and any available shares up to the total number of shares specified may be purchased or bought corresponding to the limit order until the total number of shares is reached or the limit order expires. In one embodiment, the expiration date corresponding to a limit order is the final date when such limit order may be executed as specified, and after the expiration date of a limit order has passed, the order is no longer considered open.

Limit orders may be filled during regular market hours. In one embodiment, a limit order may be specified by the user as an order which is additionally permitted to be executed after regular trading market hours ("after-hours"), or it may be specified as not allowable to execute after-hours. The specification whether the limit order is permitted, or not permitted, to be executed outside of regular market hours may be received from the user in the manner described in more detail below with respect to FIG. 3B.

An option order, including a strike price, expiration date, and an indication whether the option order is one that is to be closed immediately, may be received from a user as a call option that the user wishes to purchase, a call option that the user wishes to sell, a put option that the user wishes to purchase, or a put option that the user wishes to sell. A call option is a contractual agreement which gives the buyer of the call option the option to purchase from the seller of the call option a specified number of shares of a specified security at a fixed price (i.e. strike price) at the expiration date corresponding to the call option. A put option is a contractual agreement which gives the buyer of the put option the right to sell a specified number of shares of a specified security at a specified strike price when the put option expires. If the buyer of the put (or call) exercises the put (or call) option at the expiration date, then the seller of the put (or call) has the obligation to purchase (or sell) said shares of said security at said strike price, regardless of the current price of the specified security on the open market at the expiration date. Options are executed if the market price is more favorable to the buyer of the option than the strike price at the close of the market on the expiration date of that option.

In one embodiment, additional order details information corresponding to any relevant option orders may also be received from the user as part of step 212. For example, an indication may received from the user, such as via one or more checkboxes or other suitable user interface elements provided to the user (with a confirmation button), whether at the closing of an option on its expiration date, if any security shares are purchased on the user's behalf in the manner specified by the option order, if such shares are to be held in the brokerage account associated with the user and the order, or if such shares are to be immediately sold on the open market and funds held in the brokerage account. Relevant option orders for which such indication may be received may include call options purchased by the user and/or put options sold by the user, and the user may check an appropriate checkbox to indicate whether or not the brokerage should immediately sell security shares acquired through an exercised option order.

In one embodiment, limit and/or option orders may be received from the user as described in more detail below with respect to FIG. 3. Any number of limit orders and/or option orders may be received from the user at any time, and the process of receiving limit and/or option order information may be an independently operating process as shown by the dashed line in the Figure.

Attempt To Execute Limit Orders.

As part of a continuously executing process shown in the Figure, an attempt may be made to execute any of the user's existing limit orders in accordance with the order in a conventional manner 230. In one embodiment, an attempt may be made to execute a limit order if the expiration date corresponding to the limit order is not yet passed.

In one embodiment, an order is fully executed if the full number of shares specified by the user corresponding to such order is purchased or sold via the open market (whichever was specified by the user) at an appropriate price per share that meets the strike price specified by the user. An order not fully executed may be partially executed as part of step 230, in which case a portion, but not all, of the total number of shares specified by the user is bought or sold at the strike price.

In one embodiment, any time a limit order is partially or fully executed, such transaction is logged with the date and time that such limit order was partially or fully executed.

Receive/Execute Cancellations/Closes.

Any number of limit order expirations may occur at any time as specified in the order, and any number of limit order cancellations may be received from the user and/or executed at any time, and any number of option orders may expire and/or be closed at any time 232. In one embodiment, if any order cancellation corresponding to an open limit order is received from the user, then such limit order is marked as cancelled, and no further attempt is made to execute such limit order. In one embodiment, if the expiration date corresponding to a limit order passes before the limit order is executed, then such limit order is considered expired, and no further attempts to execute such limit order are made.

If the expiration date corresponding to an option order is reached, then the option order may be cancelled or it may be closed, by either exercising it or having it expire, in a conventional fashion. If the option order is cancelled, then the securities specified by the option order are not bought or sold in accordance with the option and the user's position, and the option is considered expired or cancelled. If the option order is closed and the buyer of the put option "puts the option" to the seller of the put, then the securities transaction specified by the put option is executed as specified, and the option order is marked as closed. In one embodiment, if the user has indicated that security shares received by that user via an exercised option order are to be immediately sold on the open market, such as by checking the appropriate checkbox described above, then any such purchased shares are immediately sold on the open market, and the funds from such transaction or transactions are deposited into the brokerage account associated with the user and option order minus any commission fees incurred by the user corresponding to such securities sale.

In one embodiment, indications to cancel an order or to close an order may be received in the manner described below with respect to FIG. 3, and any other changes made by the user to any existing orders, or any new orders placed or executed on behalf of the user, may also be received as described below with respect to FIG. 3. Any cancelations or other changes indicated corresponding to existing orders are recorded with the date and time that such cancelation or other change was received.

Receive Request To Display Orders.

At any time, a request may be received 214 from a logged in user to display orders, which may be any limit orders or any options such as call options or put options, corresponding to the user's account according to one or more display filter selections received from such user. In one embodiment, such request and display filters may be received from the user, and such requested orders may be displayed to the user, as described in more detail with respect to FIG. 2C below.

In one embodiment, a user's open orders, which may include any outstanding limit orders as well as any put or call options which have been purchased or sold, may be displayed using a graph, each open order represented by an order icon for which the appearance of the icon and its placement on the order graph are determined by any or all of the type of order (e.g. limit or option; purchase order or sale order; etc.), amount of the order already filled, if any, strike price, expiration date, and current market price of securities, as described in more detail below.

In one embodiment, the display filter or filters selected by the user to determine the orders to display may include a filter to view only limit orders corresponding to the user, or a filter to view only option orders corresponding to the user, or a filter to view only orders corresponding to the purchase of securities via the user's account, or a filter to view only orders corresponding to the sale of securities via the user's account, or a filter to view all executed limit and option orders corresponding to any securities transaction corresponding to the user's account, or any other filter or filters. Other filters may include filtering by account, by underlying security, type of order, percent difference between the market price of the underlying security and the strike price of any order, by expiration date, or by any other filter.

Select First Open Limit Order or Option Order.

A first open order corresponding to the user's account is identified and selected 216. In one embodiment, a first open order corresponding to the user's account may be identified as a limit order or an option which matches all of any filters specified by the user, and has not already been fully executed, cancelled, or closed. In one embodiment, if no such open order exists corresponding to the user's account, then no open order icons corresponding to open orders may be displayed, and the method may continue at step 254.

Identify Expiration Date, Percent Filled.

When a first open order is selected, the expiration date corresponding to the selected open order is identified, and the percentage of the selected open order which has already been filled is also identified 218. In one embodiment, the order type of the selected open order is also identified as part of step 218. As noted above, if the selected open order is a limit order, such limit order may be partially filled (if the limit order is not an all-or-nothing limit order), and if so, the percentage of the selected open limit order may be identified as the number of shares purchased or sold at the strike price divided by the total number of shares specified by the limit order.

If Order Type Is Limit Order, Then Set Zero At Strike Price.

If the selected open order is a limit order 220, then a zero point corresponding to the selected open order is set 228 to the strike price (i.e. the limit price) specified by the selected open order, and the method continues at step 240.

If Order Type Is Option Order, Then Check Commission To Close.

If the selected open order is an option order 220, then a determination may be made whether closing the option order would incur a commission fee that the user must pay 222. In one embodiment, the user may incur a commission fee corresponding to an option order if the closing or unwinding of such option order includes the purchase or sale of any securities on behalf of the user via the open market. For example, if the user has sold a call option to sell securities at a set strike price, and the user does not currently own the specified securities he/she is required to sell if the call option is exercised (i.e. the user has sold a naked or uncovered call), then a commission fee may be incurred by the user in closing such an option order due to the commission fee incurred to purchase such required security shares on behalf of the user on the open market (i.e. the user cannot sell any securities at any specified strike price unless the user first owns such securities). If the user had covered the call, no such commission would be incurred, as described below.

Alternatively, if the user owns a call option to purchase securities at a specified strike price, if such call option is exercised and the specified securities are purchased on behalf of the user at the contracted strike price, then a commission fee may be incurred by the user if the user indicates, or has indicated, that the purchased shares are to be immediately sold on the open market at the market price. No commission fee may be incurred if the acquired security shares are to be held in the user's associated brokerage account.

If the selected option order is a put option that the user has sold, and if the securities specified by such put option are put on the user by the buyer of the put option at the contracted strike price (i.e. the user must purchase the securities from the buyer of the put at the contracted strike price), then the user may sell such acquired shares immediately on the open market at the market price for a loss, or the user may keep the shares in the user's associated brokerage account. If securities acquired via an exercised put option are held on behalf of the user in one or more of the user's associated brokerage accounts, then no commission fee is incurred by the user corresponding to such option order. If such acquired securities are sold immediately on the open market at the market price, then a commission fee corresponding to such securities transaction may be incurred by the user.

In one embodiment, to determine whether any commission fees may be incurred corresponding to the unwinding of an option order, such as a call option sold by the user, the brokerage account or accounts associated with the user's log in information may be checked to determine if the required security shares are held in such account or accounts. If the shares required to cover an option order are held in one or more of the user's brokerage account or accounts, then the determination is made that no commission fee would be incurred corresponding to such option order that can be closed out using those shares.

In one embodiment, if the user has indicated that security shares acquired via an exercised option order are to be sold immediately at the market price of such security shares, then it may be determined that a commission fee is incurred by the user corresponding to the closing of such option order.

If the user has indicated to hold any such security shares acquired through such an exercised option order, then no additional securities transactions may be required to close such option order, and it may be determined that no commission fee is incurred by the user corresponding to the closing of such option order.

If No Commission To Close, Then Set Zero At Strike Price.

If no commission fee is incurred by corresponding to the selected open option order 224, or if the user has indicated not to include commission fees in calculating the zero point price corresponding to an order, or if the commission fee corresponding to the selected order is zero, then the zero point corresponding to such selected open order is set 228 to the strike price of the securities corresponding to such selected open order.

In one embodiment, option orders may be determined to incur or not incur a commission fee as described above, or all options orders may be considered to have no commission fee incurred. In one embodiment, each user may select which calculation method may be used, as described below. The method continues at step 240.

If Commission To Close, Then Set Zero At Strike Price With Commission.

If the selected open order, which is an option order, includes a commission fee to close such option order 224, then such commission fee is calculated, and the zero point corresponding to the selected open order is set 226 as the strike price of the order plus the commission fee allocated to each share in the order corresponding to such order if shares will be provided by the user if the option is exercised; or the strike price of the order less the commission if shares will be received by the user if the option is exercised.

In one embodiment, an indication may be received from the user whether to include or to not include commission fees in setting the zero point price corresponding to any open orders. If an indication not to include commission fees in the zero point price corresponding to an order is received from the user, then no commission fee or fees are calculated, and the zero point price corresponding to the selected open order is set at the strike price specified by such selected order.

Identify Percent Of Current From Zero.

The current price on the open market of the securities corresponding to the selected open order is identified, and the percentage of the current price of the securities from the zero point or strike price corresponding to the selected open order is identified 240. In one embodiment, the difference in price between the current market price of the securities corresponding to the selected open order and the zero point price of such securities is identified, and the percentage of the current price from the zero point corresponding to such selected open order is identified as the identified price difference divided by the zero point price.

For example, if the current market price of Security AA is $50/share, and the zero point price corresponding to an order for Security AA is $46/share, then the difference in price between the current market price and zero point price is calculated as $4/share, and the percentage of the current price from the zero point price is identified as $4/$46 or 0.0870 or 8.7%.

If the current market price of Security AA is $44/share, and the zero point price is $46/share, then the difference in price between the current market price and zero point price is calculated as −$2/$46 or −0.0435 or −4.4%. In one embodiment, the percentage is assigned a positive value if the difference is favorable to the user or 0% and negative otherwise.

Identify Position Via Expiration Date, Percent.

Using the percentage of current from zero identified corresponding to the selected open order, as well as the expiration date corresponding to the selected open order, the display position of the order icon representing the selected open order ("selected order icon") is identified 242. As noted above, the selected order icon's display position may be determined relative to a chart or graph, and in one embodiment, the x-axis corresponding the graph may be labeled using date and time information. The position of the order icon along such axis may be determined by identifying the amount of time (e.g. in days and/or hours) from the current date and time until the expiration date of the order corresponding to the order icon. In one embodiment, the rightmost point of the graph along the x-axis may represent the zero point of the x-axis, which is the current date and time (i.e. 0 days and 0 hours until the current date and time), and icons corresponding to orders expiring relatively sooner may be displayed closer to the right edge of graph than icons for other orders expiring relatively later. For example, an order icon corresponding to an open order which expires in two days from the current date and time may be displayed closer to the right edge of the graph than an icon corresponding to an open order which expires in ten days. The scale of the x-axis may be somewhat logarithmic, with 0-3 days to expiration taking as much room on the graph as 4-14 days, or other similar x-axis assignments. In one embodiment, the x-axis is divided into several columns: 0 days, 1-2 days, 3-10 days, and the position on the x-axis is assigned to one of such columns.

In one embodiment, the y-axis corresponding to the display graph may be labeled using percentages, and the selected order icon's position along the y-axis may be determined using the percentage of the current market price from zero point identified corresponding to the selected open order, identified as part of step 240 above. In one embodiment, the line y=0 represents the zero point line, and points above such zero point line may represent positive percentages, and points below the zero point line may represent negative percentages.

Identify Color and Glow: Recent Volatility Range.

Border color and glow information corresponding to the selected order icon are identified 244. In one embodiment, a border color of red may be identified for the selected order icon if the position of such icon has been identified as approaching the zero point line of the display graph (i.e. the current market price of the selected security is within a threshold amount of the zero point price corresponding to such selected security, and the threshold may be a function of the location of the icon on the x-axis, with smaller thresholds closer to x=0).

In one embodiment, a border glow may be assigned to the border color of the selected order icon using recent volatility information corresponding to the underlying security of the selected order on the open market. The border glow may be optionally turned on or off by the user. Such border glow may be assigned and displayed as a decreasing gradient of color extending outward from the border displayed corresponding to the selected order icon. In one embodiment, a price fluctuation range, within which the price of the underlying security of the selected order has fluctuated recently over the period remaining until the expiration of the order on the open market is identified, for example, by identifying the highest and lowest market price reached by such security within one or more specified intervals of recent time, such as the amount of time to the expiration of the order, and a thicker (as measured from the border) border glow may be assigned to the selected order icon if a greater price fluctuation range is identified for the selected security corresponding to such selected order icon, and a thinner border glow may be assigned to the border color of the selected order icon if the price fluctuation range identified for the selected security is not as great.

In one embodiment, if an order icon's position is determined to be more than a threshold distance from its zero point line (e.g. order icon's position is greater than one percentage point (positive or negative) from its zero point line, then the border color for such order icon may be identified as black or gray, and a border glow corresponding to such border color may not be assigned, or it may be assigned in a manner similar to the manner in which the border glow for an order icon crossing its zero point line is assigned.

Identify Glow Intensity: Longer Term Volatility Stability.

A glow intensity is identified 246 corresponding to the selected order icon based on how consistently the price fluctuation range identified as described above has matched the price fluctuation of the underlying security over a longer period of time corresponding to the selected order. The glow intensity will be higher if the price fluctuation of the underlying security of the selected order over a long period of time is consistently achieved on a percentage basis than if will be if the recent fluctuation is not representative of the fluctuation of the underlying security corresponding to the selected order over the longer period of time (e.g. fifteen times as long as the length of time from the date and time of display to the expiration of the order). A higher glow intensity may be identified for the selected order icon if the selected security corresponding to such order icon has tended to fluctuate differently over the longer time period than over the shorter term for which the glow is displayed, and a lower glow intensity may be identified if the selected security has tended not to fluctuate greatly over the longer time period (i.e. relatively stable security).

Display Icon Using Percent Filled, At Position, With Glow, Intensity.

An icon corresponding to the selected order is displayed 248 on the display graph, with an indication of the percent of the selected open order corresponding to such icon that has been already filled, and at the display position identified for the selected order icon, using the border color and glow assigned to the selected order icon, and the glow intensity identified for such border glow. In one embodiment, the indication of the percent of the selected open order that has already been filled may be displayed as a percentage of shading within the interior (i.e. inside the borders) of the selected order icon. For example, for an open limit order, if 100 out of 200 shares have been purchased or sold at the specified strike price, then 50% or half of the interior of the order icon displayed corresponding to such limit order may be shaded or otherwise visibly altered in color from the remainder.

In one embodiment, if one or more order icons are already currently displayed in the position identified for the selected order icon, then the selected order icon may not be displayed, or it may be displayed in the position, along with an indication that one or more additional order icons are also displayed in the same position, such as by displaying a number corresponding to such position which indicates the number of order icons displayed at such position.

If More Open Orders, Than Select Next Open Order.

If any more open orders exist (i.e. any orders which have not been fully executed, cancelled, or closed) for which a corresponding order icon has not been displayed 250, then such an open order is selected as the next open order 252 and the method continues at step 218 using the newly selected open order. Any number of open order icons may be displayed to the user for any number of open limit and/or option orders.

If No More Open Orders, Then Display Recently Filled/Canceled/Closed Orders.

If no more open orders exist for which to display a corresponding order icon 250, then any limit orders or options which have been recently filled or fully executed, cancelled, closed, and/or expired are displayed 254. In one embodiment, order icons corresponding to any orders which have been filled, fully executed, cancelled, closed, and/or expired may be displayed in a section of the display designated for such orders such as in a display column ("executed/expired orders column") to the right of the x=0 line of the open order graph, and the color of such order icons may be distinct from the color or colors used to display order icons on the open order graph. In one embodiment, such executed/expired orders column may include tabs or filters allowing the user to select to view order icons corresponding to executed orders, such as limit orders which have been fully executed or options which have been executed, or to view order icons corresponding to canceled, closed, and/or expired orders, such as canceled/expired limit orders or closed/expired options.

In one embodiment, the executed/expired orders column may be displayed immediately to the right of the x=0 line of the open order graph displayed, or it may be displayed to the right of an additional display column, such as the after-hours market column described below. In one embodiment, the executed/expired orders column may be displayed with a background color, such as light-grey, which is differentiated from the background color used in the display of the open order graph, which may be white.

Identify If After Hours Market Orders Accepted Or Executing.

At step 260, a determination is made whether, at the time of display, after-hours securities orders are being accepted and/or executed. In one embodiment, an after-hours securities order is a securities order which may be designated by the user as one that can be executed either during regular trading hours or outside of regular trading hours, such as an after-hours limit order to purchase or sell securities outside of regular trading hours. Such after-hours securities order may be accepted outside of regular trading hours, such as a limit order to purchase or sell securities at a specified strike price (which may be received outside of regular trading hours, and may also be executed outside of regular trading hours). The hours during which such after-hours securities orders may be executed and/or accepted are designated as after-hours, or after market hours, or extended-hours, and such after-hours may begin at (or after) the end of regular trading hours and end at (or before) regular trading hours begin for the next trading day. In one embodiment, after-hours trading corresponding to a given market typically occurs during the same designated time period of each trading day for such market, and if after-hours market orders are determined to be currently executing and/or accepted for a market, then such market is said to be in after-hours, or after market hours.

For example, in the US, regular trading hours corresponding to securities markets such as the NEW YORK STOCK EXCHANGE and NASDAQ STOCK MARKET are typically between 9:30 AM and 4:00 PM Eastern Standard Time (EST). On a regular trading day, the after-hours session corresponding to such markets may be open for after-hours trading between the hours of 4:00 PM and 8:00 PM EST. If the current time in the US is between such hours of 4-8 PM, then such markets are determined to be open for after-hours trading.

If After Market Hours, Display After Hours Market Column, Duplicate Icons Into After Hours Market Column At Same Y-Position.

If after-hours orders are being executed at the time of display or if such orders are being accepted 262, then an after-hours market column may be displayed as part of (or adjacent to) the display of the graph used to display the user's open orders, and any number of open order icons corresponding to open orders approved for after-hours trading are displayed in the after-hours market column 264. In one embodiment, the after-hours market column may be displayed as part of the open orders graph, or adjacent to the open orders graph, or with a space between the open order graph and the after-hours market column, or in any other manner, such that the after-hours market column is displayed between the x=0 line of the open order graph (i.e. y-axis of graph representing the current date and time) and the executed/expired orders column (i.e. column displaying orders which have been fully executed, cancelled, closed or expired) displayed next to the open order graph as described above. In one embodiment, the background of the after-hours market column may be displayed using a background color, such as gray, which is differentiated from the background color of the open order graph, as well as from the background color of the executed/expired orders column. For example, the after-hours market column may be displayed using a dark gray background color which contrasts both the white background of the open order graph and the light gray background of the expired and/or cancelled orders column.

In one embodiment, to display order icons corresponding to open orders approved by the user for after-hours trading in the after-hours market column, display characteristics corresponding to such order icons may be identified, such as in a manner similar to the manner described above with respect to FIG. 2A for open order icons. In one embodiment, any open order icon corresponding to an open order approved for after-hours trading may be displayed in the after-hours market column at the same percentage-from-market-price value (i.e. the same y-axis component) as its display position on the open order graph, and it may be displayed in the after-hours market column with the same features with which it was displayed in the open order graph, or it may be displayed with slightly altered features than its display features on the open order graph. For example, it may be displayed using a different color in the after-hours market column.

In one embodiment, at any time when the after-hours market column is displayed and any order icons are displayed in such after-hours market column as described herein, then for any open order corresponding to which an order icon is displayed in the after-hours market column, no open order icon is concurrently displayed corresponding to such order in the open order graph.

The method continues at step 266.

If Not After Market Hours, No After Hours Market Column Is Displayed.

In one embodiment, the after-hours market column may be displayed only when the after-hours market is operating, or additionally when after-hours orders are being accepted, and such column may not be displayed otherwise.

If the securities market is not currently open for after-hours trading (e.g. if the current time is during regular market hours) 262, then the after-hours market column is not displayed, and the method continues at step 266.

Draw Axes, Areas.

At step 266, the X- and Y-axes, borders defining the different display areas and columns, and shading to indicate the different display areas are added to the display. The method continues at step 216, after an optional waiting period.

Receive Request To Display Orders, Ask To Select Limit Orders Or Options, Receive Selection.

FIG. 2C describes step 214 of FIG. 2A in more detail and illustrates a method of displaying limit orders or options according to one embodiment of the present invention. Referring now to FIG. 2C, a request to display orders may be received from a logged in user, as described above, and such user may be asked to select whether to display limit orders or to display options corresponding to such request 270. In one embodiment, a pop-up window may be used to ask the user to select whether to display limit orders or options. Additionally as part of step 270, if the user provides any display filter selection in response, such display filter selection (e.g. limit orders or options) is received. In one embodiment, any number of other display filter selections may also be received from the user as described in more detail above with respect to FIG. 2.

If Selection Is Orders, Then Limit Orders Are Displayed.

If the display filter selection received from the user is an indication to display limit orders 272, then any order icons corresponding to limit orders corresponding to the user's associated brokerage accounts are displayed 274 in the manner described above with respect to FIG. 2.

If Selection Is Options, Then Options Are Displayed.

If the display filter selection received from the user is an indication to display options 272, then any order icons corresponding to options, including call options and/or put options, which have been sold or purchased using any of the user's associated brokerage account or accounts, are displayed 276 in the manner described above with respect to FIG. 2.

Receive Action.

Figure 3C:
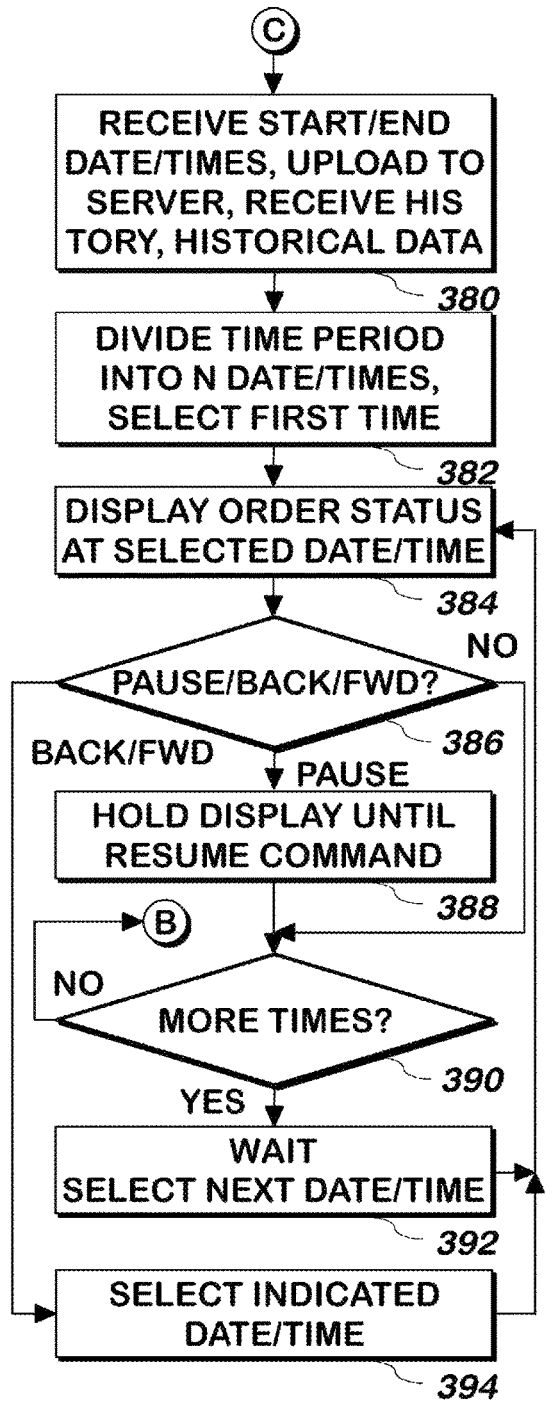

FIG. 3, consisting of FIGS. 3A, 3B and 3C describe steps 212 and 232 of FIG. 2A in more detail and illustrate a method of placing, changing, and canceling orders, and replaying previous displays corresponding to such orders according to one embodiment of the present invention. Referring now to FIG. 3, at any time, an action may be received 310 from the user via the display provided to the user as described above with respect to FIG. 2A, as well as other display information provided to the user as described in more detail below. In one embodiment, such actions may be received from the user using the touch screen capabilities of the user's device, such as if the user's device is a smartphone or tablet computer, or using any other conventional pointing device and/or keyboard. A device with touch screen capabilities is described herein, but other devices with other capabilities may also be used. Actions which may be received from the user are described below, though other actions may also be received, and any number of such actions may be received from the user at any time.

If Icon Is Selected, Then Display Details Of Corresponding Order.

If an order icon corresponding to an open order, displayed in the manner described above with respect to FIG. 2A, is selected by the user 312, then order details corresponding to the selected order icon are displayed 314. In one embodiment, an order icon may be selected by tapping the icon with a finger or stylus on the touch screen display, or by holding a finger on the icon on the touch screen display, or by clicking the icon using a pointing device, or by hovering the cursor of the pointing device over the icon, or in any other manner.

When an open order icon has been selected by the user in such a manner, then the limit order or option corresponding to such selected icon is selected, and order details corresponding to such selected order may be displayed, for example, via an associated window displayed adjacent to the selected order icon in the display. Order details displayed corresponding to a selected order may include the order type of the selected order (e.g. limit order, put option, call option, etc.); the ticker symbol corresponding to the security specified by the selected order; whether the selected order is an order to purchase shares or sell shares of the security specified, as well as the number of shares of such security to purchase or sell; the strike price (which may include the limit price of a limit order or the strike price of an option) and the current (or closing) market price of the specified security, as well as the difference between the two, which may be represented as a percentage; permission to execute a limit order in any after-hours market; the expiration date corresponding to the selected order; the portion of the selected order which has already been filled, if any; fluctuation information describing the fluctuation of the market price of the specified security over a given period of time; and any other order information, including an estimated value for any profit or loss which may be incurred corresponding to the selected order.

In one embodiment, the estimated value for any profit or loss which may be incurred by the user corresponding to any limit order may be determined as an estimate of a positive amount of funds that may be gained by the user as a profit, or a negative amount of funds that may be paid by the user as a loss, if such limit order were to be fully executed, and with respect to the securities held or not held in any of the one or more associated brokerage accounts. To calculate the estimated profit or loss corresponding to a limit order to sell securities, the user's current position with respect to the security specified by such limit order may be identified, including any price or prices previously paid by the user for any shares of security currently owned by the user, and the number of shares owned by the user. In one embodiment, such as if all the shares of the specified security were not previously purchased at the same price per share, the estimated profit or loss value may be calculated using "first in, first out" (FIFO), or the profit or loss value may be estimated in any other conventional manner, such as by using average cost, "last in, first out" (LIFO), or any other manner. In one embodiment, the estimated profit or loss corresponding to a limit order to purchase securities may be calculated as a loss equal to the value of the current market cost per share of the security specified by such limit order multiplied by the number of shares specified corresponding to such limit order.

In one embodiment, the estimated profit or loss corresponding to any option may be determined as the amount of funds that may be gained by the user as a profit, or paid by the user as a loss, if such option were to be fully executed, either at the behest of the user or at the behest of the corresponding seller or buyer of such option, at the expiration date specified by the option and with respect to the securities held or not held corresponding to any of the one or more associated brokerage accounts. To calculate the estimated profit or loss corresponding to any call option or put option purchased or sold on behalf of the user via one of the one or more associated brokerage accounts, the purchase price of such option (price to purchase the option itself) is identified, along with the strike price, security, and number of shares specified by the call option, and the current price of the specified security in the open market. In one embodiment, for a call option which has been purchased on behalf of the user via one of the one or more associated brokerage accounts, if the specified strike price is greater than market price of the specified security, then the purchase price corresponding to the purchased call option may be identified as the estimated profit and loss value. If the market price of such specified security is greater than the strike price specified by the purchased call option, then the estimated profit and loss value may be calculated using the difference between such market price and strike price corresponding to the specified security, the amount of shares specified by the option, and the purchase price corresponding to the purchased option, and any conventional manner of computer profit and loss.

For call options which have been sold via any of the one or more associated brokerage accounts, if the strike price specified by the sold call option is greater than the market price identified for the security specified by such option, then the estimated profit and loss value may be calculated as a profit equal to the amount of the purchase price gained when such call option was sold. If the strike price specified by such option is less than the market price of the security specified by such option, then the estimated profit and loss corresponding to such option may be calculated using the difference between the specified strike price and current market price corresponding to the specified security multiplied times the number of shares specified by the option and minus the purchase price of the call option which was previously gained when such option was sold to the purchaser. Additionally, in one embodiment, if the number of specified security shares corresponding to the call option are not held in any of the one or more associated contractual strike price) may also be calculated to estimate brokerage accounts, then the amount of funds needed to purchase such necessary shares (in order to then sell the specified security shares to the purchaser of the call option at the profit or loss in any conventional manner.

For put options which have been purchased by the user, if the strike price specified by such put option is greater than the market price of the security specified by the put option, then the estimated profit and loss corresponding to such put option may be calculated in a conventional manner using the difference between the strike price and market price of the security specified by the put option, the number of shares specified by the put option, and the purchase price paid to purchase such put option. In one embodiment, if the security shares corresponding to the purchased put option are already held in any of the one or more associated brokerage accounts, then the price of such security shares at the time they were purchased may be used, and the current market price of such security shares may not be used, to calculate the estimated profit or loss value in the conventional manner.

For put options which have been sold by the user, if the strike price specified by such put option is greater than the market price of the security specified by such put option, then the estimated profit and loss corresponding to such put option may be calculated in a conventional manner using the difference between the strike price and market price of the security specified by the put option, the number of shares specified by the put option, and the purchase price gained when such put option was sold.

If the strike price specified by the sold put option is less than the market price of the security specified by the sold put option, than the estimated profit or loss value may be estimated as a profit equal to the purchase price gained when the put option was sold.

In one embodiment, any number of filter selections corresponding to the method or methods which may be used to estimate profit and loss may be provided to the user, and any such filter selections selected by the user are received and stored. The estimated profit or loss corresponding to any limit order or option may be calculated as described herein or in any other manner, and such estimated profit or loss value calculated corresponding to the selected order is displayed to the user along with any other order details corresponding to the selected order as described in more detail below.

In the event that the selected icon corresponds to multiple orders, an indication that there are additional orders corresponding to the icon may be displayed, along with a user interface control to switch among such orders.

In one embodiment, as part of step 314, certain order details corresponding to the selected order may also be displayed with one or more user interface controls, such as a change order button and/or a cancel order button, to allow the user to change any order details corresponding to the selected order, or to cancel the selected order. If the user indicates the order is to be changed, user interface controls to allow the order to be changed are displayed, any changes are received, and the order is either changed or canceled and replaced with a new order corresponding to the changes as part of step 314. The process of changing or cancelling an open order, as well as other methods for doing so using the order icons displayed, are described in more detail below.

In one embodiment, order icons corresponding to previous orders which, at the time the icon is selected, are or have been fully executed, expired, cancelled, and/or closed may also be selected by the user in a similar manner, and similar order details corresponding to such fully executed, expired, cancelled, and/or closed orders may be displayed in a similar manner. For example, the date of execution and price of execution may be displayed.

The method continues at step 310.

If Action Is Search Request For Ticker Symbol Or Symbols, Then Display The Symbols And Corresponding Available Orders.

In one embodiment, one or more additional panels, in addition to the panel in which the open order graph described above is displayed, may be used to display information, including possible or available orders, such as available limit orders and/or available options, which are available to be made on behalf of the user via the user's brokerage account or accounts, or used to display any other information. In one embodiment, an alternate panel may be displayed to the left of the panel used to display the open order graph described herein, or it may be displayed on any portion of the display.

If the action received from the user as part of step 310 is a request to search for one or more ticker symbols 312, then a text box and/or other user interface controls are displayed to receive the search parameters, and such search parameters are received from the user, and any number of ticker symbols may be displayed to the user as search results, and such ticker symbols may be displayed along with any number of potential orders corresponding to each symbol 316. In one embodiment, the request to search for ticker symbols may be received with any number of search terms or parameters, including the names of companies (e.g. "APPLE"), keywords and/or related words (e.g. "furniture"), or any other search terms or combination of search terms, and any conventional search techniques may be used to identify any ticker symbols which match or closely match the received search terms. Any such ticker symbol or symbols identified as matching the received search terms may be displayed to the user, for example in the alternate display panel.

In one embodiment, each ticker symbol may be displayed along with additional information corresponding to such ticker symbol, including the current market price, and any recent and longer term fluctuations in the market price, of the security corresponding to the ticker symbol. Any number of available orders may also be displayed corresponding to each ticker symbol displayed, for example as selectable buttons or selections which may be dragged into the panel used to display the open order graph described herein or otherwise selected by the user via the user's touch screen interface, and such available orders corresponding to a displayed ticker symbol may include an available market order to purchase or sell security shares corresponding to the ticker symbol, an available limit order to purchase such security shares, and any other available positions corresponding to the ticker symbol which may be taken by the user, such as put options or call options which may be purchased and/or sold by the user. In one embodiment, each available order displayed corresponding to a ticker symbol may be dragged onto the panel used to display the open order graph by the user, and blank and/or pre-filled order details corresponding to the selected available order may be displayed in a similar manner to the manner in which order details corresponding to a selected order icon are displayed. Pre-filled details may correspond to the location on the open order graph where the user lets go of the dragging operation. Such blank and/or pre-filled order details may be displayed along with suitable user interface elements to allow the user to provide and/or change any order details corresponding to the selected available order. For example, if the user selects an available order to purchase security shares corresponding to a ticker symbol, then empty and pre-filled order details corresponding to a purchase of securities may be displayed to the user, such that the specific security to purchase is pre-filled for the user, and the number of shares to purchase, as well as any other order details corresponding to the securities purchase, may also be pre-filled, or they may be left blank, to allow the user to provide such information.

In one embodiment, as described below, the user's current position with respect to a displayed ticker symbol, including the number of shares of the corresponding security currently held by the user corresponding to the log in of step 210, if any, may be used to sort and order the available orders corresponding to a ticker symbol, and to pre-fill the details as described below. For example, if the user owns a security, available orders to sell calls or sell via a limit order may be displayed earlier on the list of available orders than if the user had not owned the security, and the number of shares corresponding to the available order may be pre-filled with a number not more than the number of shares the user owns.

If Action Is Request For Positions, Then Display Symbols, Amounts, And Available Orders.

If the action received from the user is a request for positions available to the user corresponding to securities held in the user's associated brokerage account or accounts 312, then the user's securities holdings may be displayed, including any number of ticker symbols corresponding to securities held in the user's associated brokerage account or accounts, the number of shares of each such security held, and additionally, any number of orders which are available for the user to make, corresponding to the holdings in the user's associated brokerage account or accounts 318. In one embodiment, available orders may be displayed to the user with suitable user interface elements to allow the user to select any specific available order selection displayed, and an order icon which may be dragged into the open order graph, similar to the order icons corresponding to open orders described above, may also be displayed corresponding to each available order. Such available orders selections, and any information or order icons corresponding to such available order selections, may also be displayed in an alternate section of the display from the panel displaying the open order graph.

In one embodiment, available orders selections and any corresponding icons may be displayed in the designated panel as a list, and the available orders most relevant to positions already owned by the user may be displayed before available orders that are not as relevant to the user's positions. For example, if a user owns shares of Security AA, then a market order to sell shares of Security AA, as well as a limit order to sell shares of Security AA, may be displayed on the available orders list before a market or limit order to purchase shares of Security AA, and any available call options and/or put options available to the user corresponding to Security AA may be displayed last.

At any time, any action may be newly received from the user in the manner described above at step 310.

Additional actions which may be received from the user are illustrated in the Figure at step 320, which follows the "more" branch out of step 312, and at step 350 of FIG. 3B, which follows the "more" branch out of step 320.

If Location of Order Icon is Changed, and if Relocated Order Icon Corresponds to a Limit Order, then Display Details of Order Corresponding to New Icon Location, and Receive Confirmation.

If the action received from the user is an attempt to change the location of an order icon corresponding to an existing open order 320 (displayed in the manner described above with respect to FIG. 2A), and if such order icon that the user is attempting to relocate corresponds to an open limit order 322, then the prior order details and changed order details corresponding to the relocation of such order icon may be displayed to the user, and confirmation to implement such changed order details may be requested and/or received from the user 326. In one embodiment, the user may attempt to change the location of any order icon by selecting the order icon at its initial location and dragging the order icon to a new location on the display using the touch screen and/or pointing device capabilities of the user's system.

Order details corresponding to the new location of the order icon, including the strike price and expiration date specified by the new location, may be displayed to the user as the changed details in a manner similar to the manner in which order details are displayed corresponding to open orders above (e.g. using an associated window displayed adjacent to the relocated order icon), or such order details may be displayed in any other part of the display.

In one embodiment, prior order details corresponding to the relocated order icon may additionally include the initial strike price and expiration date corresponding to the initial location of the relocated order icon, and the changed order details may include the difference between the changed and initial strike price and/or expiration date, as well as any information corresponding to any transactions which may be executed and/or fees that may be incurred to change the location of such order icon as requested. The user may manually change the displayed changed order details if desired, and such changed order details are received.

If Confirmed, Then Change Order And Redisplay Order Icon In New Location.

In one embodiment, confirmation corresponding to the relocation of the order icon and/or order details manually changed by the user may be received from the user via one or more confirmation controls, which may be displayed alongside the changed order details displayed corresponding to the new location of the order icon. If confirmation to implement the new location of the relocated order icon or manually changed order details are received from the user 328, such as if the user clicks or taps the confirmation button displayed, then the relocated order icon is displayed in its new location, the strike price and/or expiration date of the user's corresponding limit order is changed according to the changed order details confirmed by the user, and any transactions or fees corresponding to such change or changes are executed and collected as specified by the changed order details.

Any changes indicated corresponding to any option may be implemented by cancelling the initial order and placing a new order as specified by the changed order details, and any changes corresponding to a user's orders which are received and confirmed by such user as described herein may be implemented in such a manner.

In one embodiment, at the time the user confirms any changes as described herein, all details of the order are displayed to the user, not just the changed ones, and suitable user interface elements to allow the user to change any order information corresponding to the order icon just changed or selected by the user may also be provided, such as controls to change the number of shares, expiration date, or strike price specified by an order icon. For example, a text field, or a number menu, or controls to increase and decrease an amount (e.g. plus sign and minus sign) may be provided to allow the user to enter or select or otherwise modify the number of shares specified by an order icon. Any such changes may also be confirmed by the user, and when such confirmation is received, the changes are implemented as described above, and any transactions and/or fees corresponding to any such other changes are also executed and/or collected.

The user may be permitted to change the number of shares specified by an order icon using the user interface elements provided when the user changes the location of the order icon as described, or the user may also request to change the number of security shares corresponding to an order icon by manipulating the shape or position of the order icon as described in more detail below.

If Confirmation Is Not Received, Then Order Is Not Changed.

If confirmation is not received from the user corresponding to the relocation of the selected order icon 328, then no order changes are implemented corresponding to the selected order icon. In one embodiment, the order icon is displayed as before in the location it was displayed prior to the attempt to relocate it, and the method continues at step 310.

If Moved Icon Corresponds To An Option, Then Snap Icon To Available Orders Based On Date, Strike Price.

If the action received from the user is an attempt to change the location of an open order icon 320, and if such open order icon corresponds to an option 322, then the such option order icon is snapped to the nearest available location where such icon may be placed, based on the expiration date and strike price of options that are available corresponding to such order icon 324. In one embodiment, an option order icon may be snapped to the nearest available location corresponding to an option specifying the same security, for example to the date and strike price nearest to where the user has dragged the icon.

For example, if the available options corresponding to a specific security all expire at the same given time, such as on the 16th day of the month (of every month), then all the available locations for option order icons specifying such security may be in the same vertical line (or lines), representing the same available expiration date (or dates). Any attempt to relocate such an option order icon corresponding to such security may be permitted only if the new location of the order icon corresponds to such designated placement on the x-axis. If the user tries to drag the order icon up, the icon will remain in its original location until the user's mouse cursor is nearer to the next higher strike price option of the same security and expiration date, at which point the icon will appear to jump to the position corresponding to that option.

In one embodiment, the location of the order icon corresponding to an option may be changed to any of the available locations to which such icon may be snapped.

Display Details Of Order Corresponding To Change Of Icon Location, And Receive Confirmation.

All order details corresponding to the relocation of the option order icon are displayed, including before and after values for any details changed, any changes may be received, and confirmation to implement such changed order details is received or not received from the user, all in a manner similar to the manner in which similar details are displayed, changes may be received, and similar confirmation is received or not received for the relocation of limit order icons, which is described with respect to steps 326-330 above, and the change is either executed or not executed, depending on whether the user confirms the change or changes.

If Order Icon Is Dragged To Expired, Then Confirm Cancellation.

If the action received from the user is an attempt to drag an order icon corresponding to an open order into the display section corresponding to cancelled or expired orders 320, then confirmation of the cancellation of the limit order or option corresponding to such relocated order icon may be requested and/or received from the user 332. In one embodiment, the user may drag an order icon into the display section for expired and/or cancelled orders by first selecting the order icon and then dragging it to the far right side of the display, past the x=0 line representing the current date and time on the open order graph, and into the display section corresponding to cancelled and/or expired orders.

If Cancellation Is Confirmed, Then Cancel Order Corresponding To Dragged Icon And Redisplay Icon As Cancelled.

If confirmation is received from the user to cancel (or allow to expire) the order corresponding to the order icon that the user has attempted to move into the display section featuring cancelled and/or expired orders 334, then such order is cancelled, or allowed to expire, and the order icon corresponding to the cancelled order is redisplayed in its new location in the display section for cancelled and/or expired orders 336. The method continues at step 310.

If Cancellation Is Not Confirmed, Then Order Is Not Cancelled.

If confirmation is not received from the user to cancel the selected order 334, then the selected order is not cancelled, and the order icon corresponding to the selected order is displayed in its initial location prior to the user's attempt to move it into the display section corresponding to cancelled and/or expired orders, and the method continues at step 310.

If An Available Order Is Dragged Onto Open Order Display, Then Display Details Of New Order And Confirm.

If the action received from the user is an attempt to drag an icon corresponding to an available order, such as those which may have been displayed as part of steps 316 or 318 above, onto the display graph corresponding to open orders 320, then new order details corresponding to the order icon that the user is adding to the open order graph are displayed, the user may change any such details and if changed, such changes are received, and confirmation corresponding to such new order may be received from the user 340. In one embodiment, the order details are prefilled based on the location at which the user releases the mouse cursor. For example, the new expiration date or limit price may be prefilled in accordance with the location of the icon when the user releases it with the mouse, which the user is allowed to change with the other details.

If New Order Confirmed, Then Add Order And Display Open Order Icon.

If the new order is confirmed, then the new order is placed on behalf of the user in a conventional manner, any transactions corresponding to the new order are executed on behalf of the user, any fees corresponding to the new order are collected from the user, and the order icon corresponding to the new order is displayed on the open order graph in a manner similar to the manner in which open order icons are displayed as described above with respect to FIG. 2A 344. The method may continue at step 310.

If New Order Is Not Confirmed, Then New Order Is Not Added.

If the new order is not confirmed 342, then no new order is placed on behalf of the user, no new order icon is displayed on the open order graph, and the method continues at step 310.

If Icon Is Dragged Across The Zero Point Line, Then Confirm Limit Order Will Be Converted To Market Order.

If an order icon corresponding to a limit order, which is displayed on the open order graph, is dragged across the zero point line (y=0) of the open order graph 350, then confirmation may be requested from the user to convert such limit order corresponding to the order icon dragged across the zero point line to an open market order 352. In one embodiment, an order icon may be dragged from above the zero point line to (or below) the zero point line, or it may be dragged from below the zero point line to above the zero point line, and a confirmation button may be displayed to request the confirmation from the user. In one embodiment, any order details or changed order details corresponding to the such conversion of the limit order to a market order as indicated by the order icon dragged across the zero point line may also be displayed with the confirmation button provided, such as the ticker symbol of the security, number of shares, and strike price specified in the pre-converted limit order, as well as the current trading price of such specified security on the open market. In one embodiment, the user may change any order details (e.g. number of shares) corresponding to the conversion of the limit order to a market order as described herein, and the user may confirm converting the limit order to a market order by pressing the confirmation button provided.

If Confirmed, Then Convert Limit Order To Market Order.

If confirmation is received from the user to convert the limit order corresponding to the order icon which has been dragged across the zero point line to an market order 354, such as if the user presses the confirmation button provided, then the limit order is converted to a market order 356. To convert a limit order to a market order, the security shares specified by the limit order, or the updated amount of security shares if the user has changed such order details prior to pressing the confirmation button, may be purchased or sold on behalf of the user at current market value using one or more of the user's associated brokerage accounts in a conventional manner.

If Not Confirmed, Then Order Is Not Converted.

If confirmation to convert the limit order to a market order is not received 354, then the limit order is not converted to a market order, and the method may continue at step 310.

If Icon Is Dragged Into After-Hours Market Column, Then Confirm Approval Of After-Hours Trading.

If an order icon, such as one displayed on the open order graph, is dragged by the user into the after-hours market column 350, then confirmation may be requested from the user to allow the order corresponding to the order icon dragged into the after-hours market column to be traded after-hours 360. In one embodiment, a confirmation button may be displayed to request such confirmation from the user, and any order details corresponding to the order may also be displayed.

If Confirmed, Allow Order To Execute After Hours.

If confirmation is received from the user to allow an open order to be executed after hours 362, such as if the user clicks or taps the confirmation button provided, then the order corresponding to the order icon dragged into the after-hours market column is permitted to be traded after regular market hours 364. In one embodiment, an after-hours order icon may be displayed corresponding to such order in the after-hours market column during the time interval when after-hours trading occurs, as described above with respect to FIG. 2B.

If Not Confirmed, Order Is Not Allowed To Execute After-Hours.

If confirmation is not received from the user to allow the order corresponding to the order icon which has been dragged into the after-hours market column to be executed after regular market hours 362, then the order will not be permitted to execute after regular market hours, and the method may continue at step 310.

If Icon Is Dragged Out Of The After-Hours Market Column, Then Confirm After-Hours Trading Is Not Approved.

If an order icon displayed in the after-hours market column is dragged by the user out of the after-hours market column 350, then confirmation may be requested from the user to disallow the order corresponding to such dragged order icon to be traded after market hours 366, such as by displaying a confirmation button.

If Confirmed, Then Disallow Order To Be Executed After-Hours.

If confirmation is received from the user to disallow the order corresponding to the order icon which has been dragged out of the after-hours market column from being executed after regular market hours 368, such as by clicking or tapping the confirmation button provided, then the order corresponding to the order icon dragged out of the after-hours market column will not be permitted to execute outside of regular market hours 370. In one embodiment, no after-hours order icon will be displayed in the after-hours market column corresponding to such order which is not permitted to trade outside of regular market hours, as described above.

If Not Confirmed, Then Order Is Allowed To Execute After-Hours.

If confirmation is not received from the user to disallow the order, which may previously have been permitted to execute after market hours, from now being executed anytime outside of regular market hours 368, then the order corresponding to the order icon which has been dragged out of the after-hours market column is not disallowed from trading after-hours, and the method may continue at step 310.

If User Indicates Size Change Corresponding To An Order Icon, Then Display Details Corresponding to Size Change, Receive Size, And Confirm.

If any indication to change the size of an order icon is received from the user 350, then order details corresponding to such order icon and indicated size change may be displayed to the user, and a change or update to the number of security shares specified to such order may be received from the user and confirmation corresponding to the updated amount of security shares may be requested from the user 372.

In one embodiment, the user may indicate a size change corresponding to a displayed order icon by grabbing a side or a corner of the displayed icon, such as by clicking and dragging, or holding a finger down on such edge or corner, and then stretching or shrinking the size of such order icon. In one embodiment, the user may shrink the order icon by pulling the selected edge or corner inward to indicate a desire to decrease the number of shares specified in the corresponding order, or the user may stretch or expand the size of the order icon by pulling the selected edge or corner outward to make the order icon larger to indicate a desire to increase the number of security shares specified for the corresponding order. In one embodiment, the change in size of the order icon may be displayed temporarily, such as for the period of time between which confirmation corresponding to such change in order size is requested and when it is received.

In one embodiment, the initial number of shares corresponding to the order icon which is changed in size may be displayed, and a pre-fill value for the number of shares may be pre-filled based on how much of a size change is indicated by the user corresponding to the order icon, as well as in which direction such size change is indicated. The pre-filled number of shares may be displayed, and any changes to such pre-filled number of shares may be made by the user, as well as to any other order details corresponding to the order icon, and any such changes provided by the user are received.

In one embodiment, other suitable user interface elements may be displayed each order icons, which are manipulable via the user's touch screen interface, to allow the user to increase or decrease the number of shares specified for a securities order. For example, a minus sign (decrease) and a plus sign (increase) may be displayed on the upper-left and upper-right corners, respectively, of an order icon, which the user may select to indicate a size change, or a two-finger swipe motion to zoom in and/or zoom out made by the user over an order icon may be detected via the user's touch screen capabilities and received as an indication to increase (zoom in) or decrease (zoom out) the number of shares.

If Confirmed, Change Size Of Order.

If confirmation of the change to the number of security shares specified in the order corresponding to the resized order icon is received from the user 374, then the number of security shares specified for the order corresponding to the resized order icon is updated 374. In one embodiment, the resized order icon may be redisplayed in its initial size, after such size change has been confirmed (or not confirmed), and the order icon may be redisplayed with an indication of the updated amount of security shares corresponding to the order icon for which the size change indication was received.

If Not Confirmed, Size Of Order Is Not Changed.

If confirmation is not received from the user to change the number of security shares specified for the order corresponding to the resized order icon 374, then the number of security shares corresponding to such order is not changed, and the method may continue at step 310.

If User Indicates Replay, Then Receive Start Date/Time And End Date/Time, Upload To Server, And Receive History And Historical Data.

If a request is received from the user to replay any display or displays of order icons corresponding to a previous time interval 350, then the date and time of the requested beginning corresponding to such requested replay ("start date/time") and the date and time corresponding to the end of such requested replay ("end date/time") are received from the user and uploaded to the server, and any order history and historical data corresponding to the time period of the requested replay are received from the server 380. In one embodiment, order history corresponding to a time period for the requesting user may include any new orders received corresponding to such user during such time period, any changes made to such user's existing orders during such time period, including any order cancelations and/or order expirations, and any partial and/or full executions of any orders during such time period. In one embodiment, historical data corresponding to a time period for a user requesting a replay may include any number of quotations, such as the market price of any securities, and any other information corresponding to any securities, specified for any of such user's orders which are open at any time included in such time period.

Divide Time Period Into N Date/Times, Select First Time.

The time period corresponding to the requested replay, or the time beginning at the received start date/time and ending at the received end date/time, is divided into any n number of date/time intervals, and a first of such date/time intervals is selected 382. In one embodiment, to divide the time period corresponding to the requested replay into n number of date/time intervals, the length of time included between the start date/time and end date/time is identified, and such length of time is divided by n, which may be specified as any constant, to determine the length of time to be included within each of n such date/time intervals. For example, if n is specified as 20, and a replay is requested of the display of order icons over a previous day from 9 AM of such previous day to 3 PM of the same previous day, then the length of time included in such requested time period is identified as 8 hours, or 480 minutes, and the length of time included in each of the 20 date/time intervals is determined to be 24 minutes.

In one embodiment, the identified length of time included in each date/time interval may be added to the start date/time received to determine a second date/time, and such identified length of time may be added to the second date/time to identify the third date/time, and so forth, until the next date/time identified is equal to the end date/time received corresponding to the requested replay. For example, the second date/time corresponding to the example above is identified as 9:24 AM, or 9 AM plus 24 minutes, the next date/time is identified as 9:48, or 9:24 AM plus 24 minutes, and so on and so forth, until the next date/time is identified as the received end date/time, or when 2:36 PM plus 24 minutes is identified as 3:00 PM.

In one embodiment, the start date/time received corresponding to the replay requested is selected as the first selected date/time.

Display Order Status At Selected Date/Time.

Any order icons corresponding to the selected date/time are displayed as described above with respect to FIG. 2 384. In one embodiment, user interface controls to pause the replay or go back or go forward in the replay may be displayed to the user along with the requested replay, and at any time during the display of the requested replay, the user may select any of such controls provided, and such indication is received from the user.

If User Indicates Pause, Then Hold Display Until User Indicates Resume Command.

If an indication is received from the user to pause the display of the requested replay 386, such as if the user presses the pause user interface control provided, then the display of the replay when such pause indication is received is held until an indication is received from the user to resume the requested replay 388. In one embodiment, while the display is held at a display during the requested replay, a user interface control to resume the requested replay may be displayed, such as a resume button or a play button, and the pause button pressed to initiate the pause of the requested replay may not be displayed.

In one embodiment, when the indication to resume is received from the user, then the method continues at step 390.

If User Does Not Indicate Pause Or Back/Forward, And If More Date/Times, Then Wait, And Then Select Next Date/Time.

If no indication is received from the user to pause or go back or go forward corresponding to the requested replay 386, and if any additional date/time intervals exist 390, then the method may wait, and then the next of any N date/times is selected 392. In one embodiment, the next of any N date/times may be determined as described above.

If No More Date/Times.

If no more date/times 390, then the method continues at step 310.

If User Indicates Back/Forward, Then Select Indicated Date/Time.

If an indication is received from the user to go back to a prior date/time or to go forward to a more future date/time 386, then such date/time indicated by the user is selected 394, and the method continues at step 384. In one embodiment, the user may indicate to go back or to go forward to a date/time by clicking any user interface control provided to do so, such as a back or rewind button and/or a forward button, or by selecting a selectable area of the replay display corresponding to a date/time prior to the date/time being shown in the requested replay, or future to the date/time being shown in the requested replay.

In one embodiment, if the back button is pressed by the user, then the first date/time prior to the date/time being displayed in the replay may be selected. If the forward button is pressed by the user during the display of the replay, then the first date/time future to the date/time displayed in the replay may be selected.

In one embodiment, if the user selects or clicks an area of the replay display which corresponds to any date/time prior or future to the date/time being displayed in the replay, then such date/time corresponding to the display area of the user's click is selected.

Figure 4A:
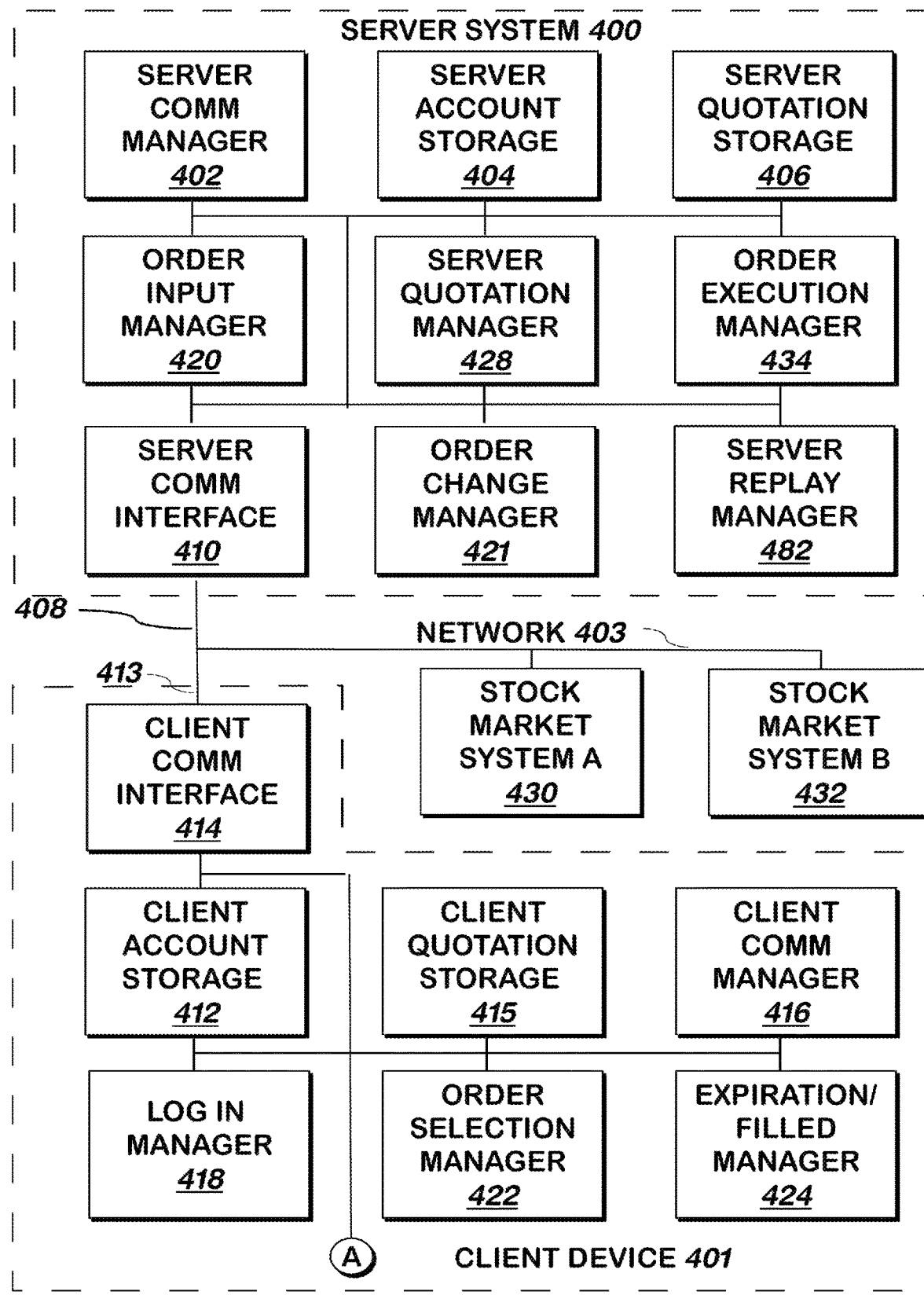
FIG. 4, consisting of FIGS. 4A and 4B is a block schematic diagram of a system for placing, displaying the status of, and receiving changes to, and cancellations of, orders according to one embodiment of the present invention.
Figure 4B:
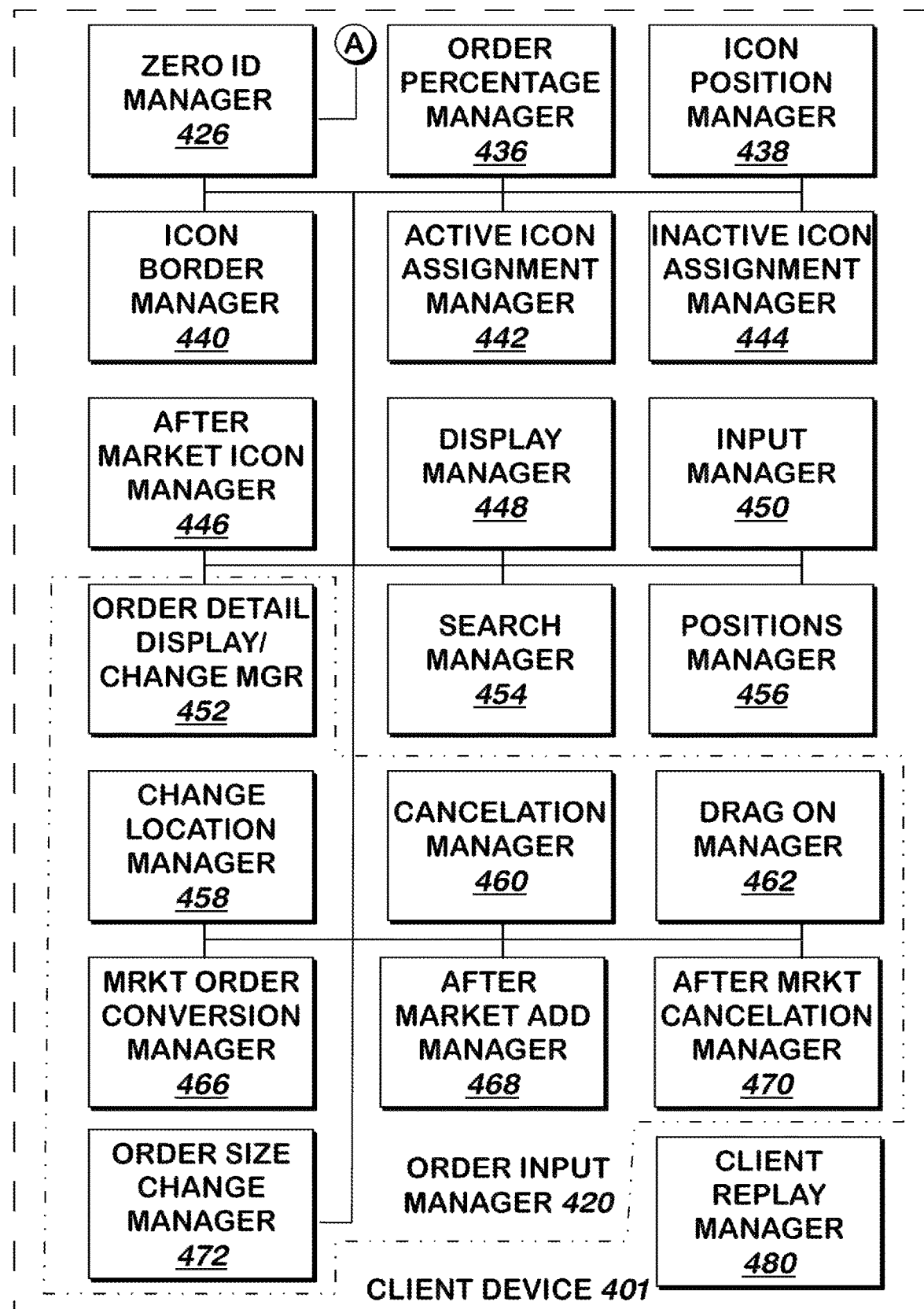

FIG. 4, consisting of FIGS. 4A and 4B, is a block-schematic diagram of a system for using icons to display and change securities orders according to one embodiment of the present invention. The system of FIG. 4 may include server system 400 any number of client devices 401 though other arrangements may be used. Server system 400 and client devices 401 operate as described herein and each include a communication interface, server communication interface 410 and client communication interface 414, respectively, each of which may include a conventional communication interface running suitable communication protocols, such as Ethernet, TCP/IP or both. In one embodiment, unless otherwise noted herein, all communications in and out of server system 400 and client devices 401 are made via their respective input/outputs 408 and 413 via network 403, which may include a conventional Ethernet network, the Internet, or both.

At any time, a user may log in to the server system 400 via the application, such as by providing log in information to the application. To provide log in information to the application, the user may start the application on the user's client device 310, which may be a tablet computer or smartphone or other device with touchscreen capabilities as described herein, or it may be a conventional personal computer, or it may be any other device. In one embodiment, the user may enter log in information via suitable user interface elements provided by log in manager 418, or the user's log in information may have been previously entered and stored via the application.

Log in manager 418 receives the log in information, including a user identifier and corresponding password as described above, and log in manager 418 may attempt to authenticate the received log in information as described above. In one embodiment, log in manager 418 provides the log in information received to server communication manager 416 with a request to authenticate the log in information.

Server communication manager 402 receives the log in information from log in manager 418 and attempts to authenticate it in any conventional manner, and if the log in information is authenticated, server communication manager 402 assigns and stores a unique session identifier corresponding to such authenticated log in information in server account storage 404 associated with the user identifier and/or one or more brokerage accounts associated with such log in information. In one embodiment, server communication manager 402 may encrypt such session identifier and provide the encrypted session identifier to log in manager 418 in response to the log in information received from log in manager 418.

Log in manager 418 receives the encrypted session identifier from server communication manager 402, decrypts the encrypted session identifier, and stores the decrypted session identifier in client account storage 412 along with the date and time such session identifier was received. When log in manager 418 has stored the decrypted session identifier in client account storage 412 along with the date and time, log in manager 418 may signal client communication manager 416 with the decrypted session identifier.

Client communication manager 416 receives the signal and session identifier from log in manager 418, and client communication manager 416 sends the session identifier to server communication manager 402 along with a request for any user orders information and/or market price information corresponding to such session identifier, which server communication manager 402 receives. Server communication manager 402 identifies any brokerage accounts associated with the received session identifier in server account storage 404, and provides user orders information and market price information corresponding to such brokerage account or accounts to client communication manager 416. In one embodiment, user orders information corresponding to the user identifier and one or more brokerage accounts may include any number of order serial numbers, each order serial number corresponding to a securities order which has been received and stored corresponding to such user identifier and brokerage account or accounts, such as limit orders for securities and/or option orders for securities (e.g. call options, put options), along with any order details corresponding to each of any such order serial numbers, including the security, number of security shares, strike price, expiration date, and any other information specified corresponding to each order serial number as described above. In one embodiment, market price information corresponding to the user identifier and brokerage account or accounts may include the market price at the time of the display described herein of any securities which are specified corresponding to any of such order serial numbers. For example, if the securities orders associated with the brokerage account associated with the user identifier include a limit order specifying 200 shares of Security AA, a put option purchased specifying 300 shares of Security GG, and a limit order specifying 250 shares of Security FF, then market price information provided by server communication manager 402 corresponding to such account may include the trading price of Securities AA, FF, and GG on the open market at the time the request is received, as well as any other information describing the price, or fluctuation of the price, at which the security has been traded in the short-term, or long-term, or both. In one embodiment, server communication manager 402 may identify securities relevant to any associated brokerage account in server account storage 404, and server communication manager 402 may retrieve any market price information corresponding to such securities from server quotation storage 406. In one embodiment, server communication manager 402 may provide user orders information and market price information to client communication manager 416 with the received session identifier.

Client communication manager 416 receives the user orders information, market price information, and session identifier from server communication manager 402 and stores the received user orders and market price information in client account storage 412. In one embodiment, client communication manager 416 may store such information in client account storage 412 with a timestamp including the date and time for when such information was received.

At any subsequent time, as part of an ongoing process, client communication manager 416 may send the session identifier in client account storage 412 to server communication manager 402 and request any updates to user orders and/or market price information corresponding to the session identifier. Client communication manager 416 may request such updates at regular time intervals, such as every thirty seconds, or every minute, or at any other intervals, or when signaled to do so by another element, or at any other time.

Server communication manager 402 receives any such requests for updates to user orders (including new user orders) and/or market price information from client communication manager 416, and if any such user order updates or changes, or any such changes to market price information, have been received and stored in server account storage 412 corresponding to the user identifier and brokerage account or accounts associated with the received session identifier, or stored in server quotation storage 406 corresponding to any securities specified by any such orders in server account storage 412, then server communication manager 402 may provide such updated information to client communication manager 416 in response, along with the received session identifier. In one embodiment, if no such updated information is identified, then server communication manager 402 may provide an indication that no updated information is available.

Server quotation manager 428 may retrieve market price information corresponding to any number of securities from any number of stock market systems 430, 432, or other quotations systems, regularly at time intervals (e.g. every 5 seconds) or at any time. Server quotation manager 428 may also retrieve market price information corresponding to any number of available option orders, including available put option orders and/or call option orders, corresponding to such securities from such stock market systems 430, 432 at time intervals or at any time. In one embodiment, server quotation manager 428 may store any such market price of securities and/or market price of option orders retrieved in server quotation storage 406 along with the date and time that such information was retrieved.

Client communication manager 416 receives any updated information from server communication manager 402 and stores it in client account storage 412. In one embodiment, client communication manager 416 may store updated information in client account storage 412 with the date and time such updated information was received. In one embodiment, whenever client communication manager 416 has received and stored user orders and market price information, or received and stored updates to user orders and/or market price information, in client account storage 412, it may signal order selection manager 422 to display, or redisplay, orders as described above.

Additionally, using the application, the user may place any new orders corresponding to the user's associated brokerage account or accounts, including placing new market orders or new limit orders, and/or purchasing or selling any new call option or sell option orders, or the user may cancel any existing limit orders or option orders, or make any other changes to any existing securities orders, as described above with respect to FIG. 3. If the user places any new limit orders or option orders, or makes any changes to any existing limit orders or option orders, or cancels any outstanding limit orders or option orders in the manner described above, then order input manager 420 may receive such information as described in more detail below and store such new, changed, or canceled securities order information received in client account storage 412 associated with the date and time when such order information was received and the appropriate order serial numbers, as described in more detail below. As noted above and described herein, order input manager 420 may receive order information from the user corresponding to placing, changing, or canceling limit orders, as well as to purchasing or selling option orders, such as call options or put options, or changing, or canceling option orders.

In one embodiment, when order input manager 420 stores any new, changed, or canceled orders information in client account storage 412, order input manager 420 may signal client communication manager 416 with the user identifier and brokerage account or accounts corresponding to the received session identifier. Client communication manager 416 receives any signal from order input manager 420, and provides any new, changed, or canceled order information in client account storage 412 to server communication manager 402 along with the session identifier stored in client account storage 412 in the manner described above. In one embodiment, server communication 402 receives new, changed, or canceled order information provided by client communication manager 416, and server communication manager 402 stores such received information in server account storage 404. Server communication manager 402 stores any canceled or changed order information in server account storage 404 with the date and time such order information is received, and server communication manager 402 additionally stores any new order information in server account storage 404 associated with an order serial number it assigns and provides such assigned order serial number to client communication manager 416 in response to such new order information received.

In one embodiment, when server communication manager 402 has received and stored in server account storage 404 any new, changed, and/or canceled orders information, it signals order execution manager 434, which receives the signal and attempts to execute orders in client account storage 416 as described herein. Order execution manager 434 additionally attempts to execute any such orders as part of an ongoing process.

To attempt to execute any open limit orders, including any limit orders which are not already fully executed, or canceled, or expired, as described above, corresponding to the user's brokerage account or accounts in server account storage 404, order execution manager 434 retrieves order details, described above, corresponding to any number of limit orders placed by the user using one or more of the user's associated brokerage accounts from server account storage 404, and retrieves securities prices or quotations from server quotation storage 406, which are regularly updated as described above. Using any order details retrieved and securities quotations retrieved, order execution manager 434 executes limit orders as applicable using conventional limit order execution techniques. In one embodiment, order execution manager 434 may mark the order serial number corresponding to any limit order it fully or partially executes as being fully or partially executed in server account storage 404. To mark an order serial number in server account storage 404 as executed, order execution manager 434 may store the number of security shares purchased or sold on the market corresponding to the order serial number, along with the price at which such securities were purchased or sold and the date and time when such securities were purchased or sold.

Order execution manager 434 does not execute any limit orders for which the expiration date has passed, and order execution manager 434 does not execute any limit orders which have been marked as canceled in server account storage 404. In one embodiment, order execution manager 434 may mark any limit orders in server account storage 404 which have not been executed as expired when the expiration date corresponding to such limit order is reached.

Order execution manager 434 additionally attempts to execute in a conventional manner any securities transactions corresponding to any option orders in server account storage 404 for which the expiration date has been reached, and which have been marked as option orders to be exercised and/or closed as described above.

As noted above, when client communication manager 416 has stored orders information in client account storage 412, it may signal order selection manager 422 to display orders information as described above, and order selection manager 422 receives such signal from client communication manager 416. In one embodiment, order selection manager 422 initializes the display of the user's orders, including the display of the open order graph, optional after-hours market column, executed/expired orders column, and any other display panels used to display order icons corresponding to the user's orders, as described above. In one embodiment, order selection manager 422 makes a determination whether an after-hours market column is to be displayed adjacent to the open order graph as described above, such as by checking a system clock, and based on such determination, order selection manager 422 identifies the location coordinates corresponding to the edges of the open order graph, the after-hours market column (if such column is to be displayed), the executed/expired orders column, and any other display areas which may be used to display order icons.

In one embodiment, order selection manager 422 initializes display coordinates corresponding to the inactive display buffer, which may be any conventional display coordinates, corresponding to the identified edges or borders of the open order graph (e.g. the upper left-most pixel and the lower right-most pixel of the rectangular area used to display the open order graph), as well as any other columns or panels which are to be used to display order icons as described above.

In one embodiment, order selection manager 422 may request from the user one or more filter selections corresponding to the type or types of user orders to display, including whether to display limit orders or option orders as described above, or any other filters corresponding to which orders to display, as described above. If the user provides the requested filter or filters, including whether to display limit orders or option orders, order selection manager 422 receives any filter selections provided, and order selection manager 422 may store such received filter selections in client account storage 412, along with the date and time such filter selections were received. In one embodiment, order selection manager 422 may identify any filter selections which have been previously received from the user and stored in client account storage 412, and order selection manager 422 may use such previous filter selections to initialize the display as described herein.

Order selection manager 422 selects a first open order, which may be an open limit order or it may be an open option order, based on whether the user has selected to view limit orders or option orders as described above, corresponding to the selected brokerage account associated with the log in information received, as described above. To select the first open order, order selection manager 422 identifies and selects an order in client account storage 412 which is marked as an open order (or not marked as an order which has been fully executed, expired, closed, or canceled). In one embodiment, if order selection manager 422 receives or identifies a filter selection from the user indicating that limit type orders are to be display, as described above, then order selection manager 422 selects a limit order in client account storage 412 marked as an open order, and if order selection manager 422 receives or identifies a filter selection from the user indicating that the type of orders to display are option orders, as described above, then order selection manager 422 selects an open option order in client account storage 412 as the selected open order.

In one embodiment, order selection manager 422 builds an order icon object corresponding to the selected open order, including the order serial number corresponding to such selected open order and any display coordinates corresponding to the display of the open order graph order selection manager 422, identified as described above, and order selection manager 422 provides such order icon object to expiration/filled manager 424.

Expiration/filled manager 424 receives the order icon object from order selection manager 422, identifies the expiration date in client account storage 412 associated with the order serial number included in the order icon object, and also identifies any percentage filled information corresponding to such order serial number in client account storage 412, if any portion of the order corresponding to such order serial number has been marked as filled, such as corresponding to an open limit order. In one embodiment, expiration/filled manager 424 identifies the expiration date corresponding to the order serial number in client account storage 412 and may calculate the amount of time, such as in days and/or hours, between such identified expiration date and the current date and time or date and time of display.

In one embodiment, expiration/filled manager 424 may identify percentage filled information in client account storage 412 corresponding to the received order serial number as a percentage of the number of shares which have been purchased or sold corresponding to such order, if any, out of the total number of shares specified corresponding to such order, as described above. In one embodiment, expiration/filled manager 424 adds the expiration date information calculated and percentage filled information identified to the received order icon object, and expiration/filled manager 424 and provides the order icon object to zero identification manager 426.

Zero identification manager 426 receives the order icon object from expiration/filled manager 218, identifies a zero point price corresponding to the received order icon object, adds such zero point price to the order icon object, and provides the order icon object to order percentage manager 436. To identify the zero point price corresponding to the received order icon object, zero identification manager 426 may identify the order type associated with the object serial number corresponding to the received order icon object in client account storage 412. In one embodiment zero identification manager 426 identifies the order type corresponding an order serial number in client account storage 412 as a limit order to sell or purchase shares at a specified strike price, or as a put option or call option purchased or sold by the user as described above. Zero identification manager 426 may store an indication of the order type identified in the order icon object it received.

If zero identification manager 426 identifies the order type as a limit order, then zero identification manager 426 may set the zero point price corresponding to such limit type order as the limit strike price specified corresponding to the order serial number in client account storage 412.

If zero identification manager 426 identifies the order type corresponding to the order serial number included in the order icon object as an option order, such as a put option which has been purchased or sold on behalf of the user, or a call option which has been purchased or sold, as described above, then zero identification 426 may determine whether any commission fees would be incurred by the user in closing such option order as described above.

To determine whether to include any commission fees in the zero point price corresponding to an order object, zero identification manager 426 may retrieve holdings information corresponding to one or more brokerage accounts corresponding to such order serial number in client account storage 412, including any securities and/or funds held in such brokerage account as described above, as well as any order details information corresponding to the order serial number received, including details which may indicate whether any securities which may be acquired if such option order is exercised should be held in the user's brokerage account, or if such securities should be sold immediately on the open market as described above. In one embodiment, zero identification manager 426 may signal client communication manager 414 to request and receive any holdings information, or updated holdings information, corresponding to such brokerage accounts, and client communication manager 414 receives the signal, complies as signaled, and stores any holdings information received in client account storage 412 along with the date and time such holdings information was received and store.

If zero identification manager 426 determines that a commission fee is included in closing the option order corresponding to the order serial number received in the order icon object, then zero identification manager 426 identifies such commission fee as described above, identifies the zero point price corresponding to the order serial number included in the order icon object using the strike price and number of security shares specified corresponding to such order serial number in client account storage 412, as well as the commission fees it identifies, as described above. In one embodiment, zero identification manager 426 may divide the commission fee it identifies by the number of security shares specified corresponding to the order serial number included in the received order icon object.

If zero identification manager 426 determines that no commission fee is to be incurred in closing the option order as described above, then zero identification manager 426 may set the zero point price corresponding to the order icon object as the strike price specified in client account storage 412 corresponding to the received order serial number, as described above.

In one embodiment, if zero identification manager 426 identifies a filter and/or setting associated with the user identifier in client account storage 412 which indicates that commission fees are not a factor in calculating the zero point price corresponding to any open order, then zero identification manager 426 may not calculate any commission fee corresponding to the selected order and zero identification manager 426 identifies the zero point price corresponding to such selected open order as the strike price specified by the option order, as described above.

Zero identification manager 426 adds the zero point price it identifies to the received order icon object, and zero identification manager 426 provides the order icon object to order percentage manager 436.

Order percentage manager 436 receives the order icon object from zero identification manager 426, and order percentage manager 436 identifies the "percent from zero" corresponding to the order icon object and adds the percent from zero identified to the order icon object. In one embodiment, to identify the percent from zero corresponding to an order icon object, percentage manager 436 identifies the difference between the zero point price stored in the order icon object and the market price of the specified security corresponding to the order icon object, which percentage manager 436 may retrieve from client account storage 412 associated with the order serial number included in the received order icon object, and divides the difference identified by the zero point price, as described above. In one embodiment, order percentage manager 436 stores the percent from zero it identifies in the received order icon object and provides the order icon object to icon position manager 438.

Icon position manager 438 receives the order icon object, and icon position manager 438 identifies the position or location where an open order icon corresponding to the order serial number included in the received order icon object is to be displayed with respect to the open order graph as described above. In one embodiment, icon position manager 438 identifies the location on the open order graph of such open order icon using expiration date information and percent from zero information included in the order icon object, and icon position manager 438 adds location information corresponding to such location of the open order icon it identifies to the received order icon object, and icon position manager 438 provides the order icon object to icon border manager 440.

Icon border manager 440 receives the order icon object and identifies the border color and border glow corresponding to the such order icon object as described above. In one embodiment, icon border manager 440 may retrieve market price information corresponding to the specified security from client account storage 412 and associated with the order serial number included in the received order icon object to identify the fluctuation of such market prices (or icon border manager 440 may retrieve the fluctuation information from client account storage 412) to identify in the manner described above the border color and border glow of the order icon corresponding to the received order icon object. Icon border manager 440 stores the border color and glow corresponding to such order icon in the received order icon object.

Icon border manager 440 also identifies the intensity of the border glow corresponding to the selected order icon using such information in the manner described above, and icon border manager 440 adds the glow intensity identified to the order icon object. In one embodiment, icon border manager 440 identifies longer term volatility or longer term stability of the security specified by the selected open order to determine the glow intensity of the selected open order's corresponding order icon. When icon border manager 440 has added the border color, glow, and glow intensity to the order icon object, it provides the order icon object to active icon assignment manager 442.

Active icon assignment manager 442 receives the order icon object from icon border manager 440, and active icon assignment manager 442 adds an order icon corresponding to the received order icon object to the inactive display buffer. In one embodiment, active icon assignment manager 442 adds the order icon shaded according to the percent filled information included in the order icon object, at the position or location of the order icon as indicated in the object, with the border color, border glow, and border glow intensity indicated in the received order icon object.

In one embodiment, active icon assignment manager 442 builds an active icon display table corresponding to the display of the open order graph, which may include an index of any pixels included in the display of the open order graph, and active icon assignment manager 442 may provide or make available the active icon display table to display manager 448. In one embodiment, for any such pixels corresponding to the display of an open order icon, active icon assignment manager 442 associates the display coordinates corresponding to the boundaries of such pixels with the order serial number corresponding to the open order icon displayed using such pixels. Active icon assignment manager 442 may define the boundaries of the order icon displayed as the upper left-most and lower right-most pixels or display coordinates corresponding to the display of such order icon, and active icon assignment manager 442 may define the boundaries of the open order graph using the display coordinates of the upper left-most and lower right-most pixels of such open order graph, based on the indication in the received order icon object whether the after-hours market column is to be displayed or not displayed. In one embodiment, active icon assignment manager 442 provides the order serial number included in the order icon object to order selection manager 422 along with a signal to select a new open order.

When order selection manager 422 receives the order serial number and signal from active icon assignment manager 442, order selection manager 422 determines whether any additional open orders, matching any display filters selections received or identified as described above, exist for which to display an order icon as described herein. If order selection manager 422 determines that any such additional open orders exist in client account storage 412 for which to display an order icon, then order selection manager 422 selects the next such open order in client account storage 412, which may be a limit type order or an option type order based on the user's display filter selections, builds an order icon object corresponding to such selected open order, and provides the order icon object to expiration/filled manager 424 in the manner described above.

If order selection manager 422 determines that no more open orders exist in client account storage 412 for which to display additional order icons, then order selection manager 422 selects any number of orders in client account storage 412 marked as fully executed or closed, or marked as canceled or expired. In one embodiment, order selection manager 422 may select such order or orders which are marked with the most recent date and time, or close to the most recent date and time, for when such order was fully executed, closed, canceled, or expired. In one embodiment, order selection manager 422 builds an order object corresponding to each of such executed, closed, canceled, or expired orders, including the order serial number associated with each executed, closed, canceled, or expired order in client account storage 412, and also including any order details associated with the selected order in client account storage 412, including the order type, strike price, expiration date and/or the date and time such order was fully executed, closed, or canceled, and any other order details or other information stored corresponding to such order as described above. Order selection manager 422 may include in each order icon object the display coordinates corresponding to the borders of corresponding to the executed/expired orders column it has identified as described above Order selection manager 422 provides the order icon object or objects to inactive icon assignment manager 444, which receives any order icon objects provided by order selection manager 422, identifies the expiration date or date when such order was fully executed, exercised, closed, or canceled as described above, as well as any additional order details corresponding to each order serial number included in each order icon object, and adds any number of inactive order icons corresponding to recently filled, closed, canceled and/or expired orders to the inactive display buffer as described above. In one embodiment, inactive icon assignment manager 444 adds the executed/expired orders column, as described above, to the display buffer, along with any number of inactive order icons in such column, which may be displayed to the right of the display panel used to display the open order graph, as described above.

In one embodiment, inactive icon assignment manager 444 builds an inactive icon display table corresponding to the display of the executed/expired orders column, which may include an index of any pixels included in such displayed executed/expired orders column. In one embodiment, inactive icon assignment manager 444 may associate the display coordinates corresponding to pixels displaying an inactive order icon in the executed/expired orders column with the order serial number corresponding to such inactive order icon in client account storage 412. Inactive icon assignment manager 444 may define the display boundaries of an inactive order icon as the upper left-most and lower right-most pixels or display coordinates used to display such inactive order icon, and inactive order icon manager 444 may provide the inactive icon display table including the display coordinates corresponding to each inactive order icon added to the display to display manager 448.

In one embodiment, if order selection manager 422 has determined, as described above, that an after-hours market column is to be displayed, order selection manager 422 identifies any open orders in client account storage 412 which have been marked as permitted by the user to be traded after hours, and builds an order icon object corresponding to each such identified open order, including the order serial number corresponding to each order, as well as any order details, including the order type, strike price, and expiration date, corresponding to such order. In one embodiment, order selection manager 422 may include in each order icon object the display coordinates corresponding to the borders of the after-hours market column it has identified as described above.

Order selection manager 422 provides each of such order icon objects corresponding to open orders which have been marked as approved for after-hours trading as described above to after hours icon manager 446 along with a signal to add the after hours column, including an order icon corresponding to each order icon object provided, to the inactive display buffer. After hours icon manager 446 receives the signal from order selection manager 422 and any order icon objects corresponding to open orders which are permitted to be traded after market hours and displays each order icon corresponding to each of such orders as signaled in the manner described above.

In one embodiment, after hours icon manager 446 adds the after-hours market column to the inactive display buffer in between the open order graph and the executed/expired orders column as described above, and after hours icon manager 446 may build an after-hours icon display table similar to the active icon display table and inactive icon display table built by active icon assignment manager 442 and inactive icon assignment manager 444 above, respectively. In one embodiment, after hours icon manager 446 provides the after hours icon display table to display manager 448, and after hours icon manager 446 signals order selection manager 422 that the after hours market column has been added to the inactive display buffer.

After order selection manager 422 has received a signal from active icon assignment manager 442 and from inactive icon assignment manager 442 that active and inactive icons have been added to the display buffer, and if order selection manager 422 has determined that no after hours column is to be displayed or order selection manager 422 has received the signal from after hours icon manager 446 that the after hours market column has been added to the inactive display buffer, then order selection manager 422 may signal display manager 448 to add the x- and y-axes of the open order graph, the border or borders between each area of the display, and the shading corresponding to one or more of the columns included in the display (e.g. grey shading for the expired/canceled orders column, etc.) to the inactive display buffer, as described above.

Display manager 448 receives each of any display tables provided from any elements adding order icons to the inactive display buffer, as well as the signal from order selection manager 422, and display manager 448 adds the x- and y-axes to the inactive display buffer provided, as well as the borders and shading as described above. In one embodiment, display manager 448 signals the operating system (not shown) to display the inactive display buffer, and display manager 448 makes available each of any icon display tables it has received to input manager 450. Display manager 448 may also include in the display one or more user interface elements and/or controls to allow the user to search for ticker symbols as described above, or request the user's positions corresponding to the holdings in the associated brokerage account or accounts as described above.

Input manager 450 receives any display table or tables from display manager 448. At any time, input manager 450 may also receive an action from the user via the operating system (not shown), as described above. In one embodiment, input manager 450 may receive an action from the user as a specific motion or other type of input at a specified location of the display provided to the user. Input manager 450 may receive such motion and/or location as one or more sets of display coordinates via the touchscreen capabilities of the user's client device 310 as described herein, and input manager 450 may identify the action or type of action received using such display coordinates received.

If input manager 450 receives the user action as a tap or click on a button or other user interface control to search for ticker symbols using a search term as described above, then input manager 450 signals search manager 454 with the search action object. In one embodiment, the user may input any search term or terms via a provided text field and tap the button to search for ticker symbols. Input manager 450 may receive any such terms entered by the user along with the user's tap and provide the search terms to search manager 454, or search manager 454 may receive the signal from input manager 450 and provide the search user interface elements described to receive the search terms. Search manager 454 receives the search terms, identifies any ticker symbols matching the received search terms as described above, and displays such identified ticker symbols, along with any available orders corresponding to each of such ticker symbols, as described above.

In one embodiment, search manager 454 builds a search results display on the inactive display buffer to display such ticker symbols as search results as described above, and search manager 454 may also build a search display table corresponding to the search results display it has built, associating display coordinates of the display buffer panel with the corresponding information displayed at such coordinates. Search manager 454 may associate display coordinates with any number of buttons or other user interface elements corresponding to ticker symbols displayed, available orders displayed, as well as any other information displayed. Search manager 454 may provide the search display table to input manager 450.

In one embodiment, search manager 454 may also provide suitable user interface controls corresponding to each ticker symbol displayed to allow the user to request to view available option orders corresponding to such ticker symbol as described above.

If the user requests to view available option orders corresponding to a displayed ticker symbol, such as buy clicking the user interface control provided to do so, search manager 454 receives such request, and retrieves available option orders information corresponding to the specified ticker symbol from client account storage 412. In one embodiment, search manager 454 may signal client communication manager 416 to request the most recent of such available option orders information from server communication manager 402 and store such information in client account storage 412. Client communication manager 416 receives the request and complies, and client communication manager 416 signals search manager 454 when such information has been stored as described above.

In one embodiment, search manager 454 adds an available orders icon to the inactive display buffer corresponding to each available options order it retrieves in client account storage 412 corresponding to the requested ticker symbol. In one embodiment, search manager 454 builds a new display buffer, or updates the display buffer, to display available orders information it retrieves corresponding to the user click as described above. Whenever search manager 454 builds a new display buffer to display search results or available orders corresponding to search results in the manner described, search manager 454 may also build a new search display table as described and provide the search display table to input manager 450.

If input manager 450 receives the user action as a tap on user interface elements provided to allow the user to request available orders information corresponding to the user's positions, including any securities or securities orders held in the user's brokerage account or accounts as described above, then input manager 450 may signal positions manager 456, which receives the signal from input manager 450, and displays positions information, including available orders information corresponding to such positions as described above. In one embodiment, positions manager 456 may display one or more buttons corresponding to each available order displayed, and positions manager 456 may build and provide a positions table to input manager 450 which associates display coordinates of the display buffer corresponding to such buttons with the available order to which it corresponds.

For example, positions manager 456 may build the display to include an available order button for a limit order to purchase shares of a specified security, and positions manager 456 may build the positions display table and associate the display coordinates corresponding to the buffer location where such available order button is displayed with the order details corresponding to such button.

If the user taps any order icon included in the display, then input manager 450 receives the user action from the operating system (not shown), identifies the display panel or panels corresponding to the received location coordinate or coordinates, and using any display table or tables provided corresponding to such display panel or panels, input manager 450 identifies the display component at the location or locations corresponding to the user action received.

If the display component at the initial location of the user's action corresponds to an order icon, then in one embodiment, input manager 450 builds an action object corresponding to such user action received, including an action serial number, the display coordinates corresponding to the initial location of the user's action, the display coordinates corresponding to the ending location of the user's action, and the order serial number corresponding to the order icon displayed at the initial location coordinates. In one embodiment, input manager 450 may identify the user action as a tap if the initial location and ending location corresponding to the user's action are within a threshold distance from each other; otherwise, input manager 450 may identify the user action as a dragging motion.

If input manager 452 identifies the user action as a tap on any order icon displayed, then input manager 450 builds the action and provides the action object to order details display/change manager 452, which receives it. When order details display/change manager 452 receives the action object from input manager 450, order details display/change manager 452 displays order details corresponding to the order serial number included in the received action object and may provide to the user one or more suitable user interface controls to allow to user to request to make a change to the selected order, such as a change button or link, as described above. In one embodiment, order details display/change manager 452 retrieves order details corresponding to the order serial number included in the action object from client account storage 412, and order details display/change manager 452 may pop a new display window to display such order details corresponding to the order icon included in the action object.

The user may request to make a change to any open order using the icons provided, such as by tapping or selecting the change button provided by order details display/change manager 452 corresponding to an open order icon that the user has selected as described above, or by using any of the methods described above and in more detail below.

In one embodiment, input manager 450 may identify the received user action as a dragging motion corresponding to an order icon as described above.

If the user drags an open order icon across the x-axis of the open order graph, then input manager 450 provides the action object to market order conversion manager 466, which receives the action object as described in more detail below.

If the user drags the open order icon to a new location on the open order graph that does not cross the x-axis, then input manager 450 provides the action object, including the action serial number, user action received, initial location coordinates of the user's action, ending location coordinates of the user's action, and order serial number to change location manager 458. Change location manager 458 receives the action object from input manager 450, and change location manager 458 identifies order details information corresponding to the order serial number included in the received action object in client information storage 412 and identifies whether such order details correspond to a limit order or to an option order.

If the order serial number included in the received action object corresponds to a limit type order, change location manager 458 may identify pre-fill values for any order details corresponding to the new location of the relocated order icon, including as a pre-fill value for the strike price and/or a pre-fill value for the expiration date corresponding to the new location of the order icon.

In one embodiment, change location manager 458 determines changed order details using order details corresponding to the order serial number included in the received action object and the initial and ending location coordinates included in the action object. Change location manager 458 may retrieve order details corresponding to the order serial number included in the received action object, including the security and number of shares of such security specified by the order serial number, the strike price, as well as the most recent market price information corresponding to the specified security from client account storage 412, and use the shift indicated by the initial and ending location coordinates to determine changed order details. For example, if the icon is moved right along the x-axis (e.g. closer to the right edge of the open order graph), then change location manager 458 may add a pre-fill value for the new expiration date corresponding to the moved icon to a date and time that is closer to the date and time of display as described above.

If the icon is moved up or down along the y-axis, indicating a request to change the strike price corresponding to the order serial number, then change location manager 458 may calculate and add a changed order strike price to the received action object accordingly. For example, if the initial and ending locations included in the action object are both above the x-axis, and the ending location is moved down along the y-axis (i.e. closer to the x-axis than the initial location), then change location manager 458 may add a changed order strike price which is above the market price of the specified security and closer to the market price than the initial strike price. In one embodiment, change location manager 458 identifies the percent from zero value corresponding to the new location coordinates received in the manner described above, and calculates a pre-fill value for the changed order strike price corresponding to the new icon location using such percent from zero value and the market price of the specified security, retrieved from client account storage 412. Change location manager 458 may add changed order details corresponding to the relocated order icon, including any pre-fill values calculated as described herein, to the action object and provides the action object to order detail display/change manager 452 along with a request to confirm the changed order details included in the action object.

If the order serial number included in the action object it receives corresponds to a call or put option, change location manager 458 may snap the new location of the relocation order icon to a location on the open order graph which is available to such order icon as described above. In one embodiment, change location manager 458 may identify the specified security corresponding to the order serial number received in the action object, and change location manager 458 may identify available option orders corresponding to such specified security from client account storage 412. In one embodiment, for example if no such information exists in client account storage 412, or if the date and time corresponding to when such information was stored is not within a recent information threshold date and time, change location manager 458 may signal client communication manager 416 to request such option orders information, or updates to the information, from server communication manager 402 and store the option orders information or updates in client account storage 412. Change location manager 458 may identify from the available option orders identified in client account storage 412 an option order for which the position of a corresponding order icon is proximate to the last location coordinates received in the action object, and change location manager 458 may snap the relocated order icon object to such a position, as described above.

Change location manager 458 may identify pre-fill values for the option order details as available order details which most closely match order details corresponding to the new location of the relocated order icon, including a pre-fill value for the strike price and/or expiration date corresponding to such available option order. Change location manager 458 may add the pre-fill values identified to the action object and provide the order object to order details display/change manager 452, along with a request to confirm such pre-filled changed order detail values with the user.

Order details display/change manager 452 receives the request and action object from change location manager 458. In one embodiment, when order detail display/change manager 452 receives an action object, it displays the changed order details corresponding to the new location of the order icon as described above using any pre-fill values received in the action object, which may include pre-filled values for the strike price and expiration date indicated by the new location of the order icon, and order details display/change manager 452 may also display none, some, or all of the initial order details corresponding to the initial location of the relocated order icon, as described above. In one embodiment, order details display/change manager 452 may retrieve any order details corresponding to the initial location of the order serial number included the received action object from client account storage 412.

If the order type corresponding to the order serial number received in the action object is a limit order type, then order details display/change manager 452 may provide any number of suitable user interface elements to allow the user to manually provide and/or change any changed order details corresponding to the new location of the order icon to any value, including those for which pre-filled values are displayed or not displayed, as well as one or more suitable user interface controls to allow the user to confirm or to cancel (i.e. not confirm) the changed order details displayed, as described above.

If the order type corresponding to the order serial number included in the action object is an option order type, as described above, then order details display/change manager 452 may provide user interface elements to allow the user to select, from a finite set, values for changed order details corresponding to the new location of the relocated order icon. For example, order details display/change manager 452 may provide a pull-down menu including the available values for order details according to available option orders corresponding to the specified security, which order details display/change manager 452 may retrieve from client account storage 412 associated with the order serial number included in the action object it received.

To display such information and request confirmation from the user, order details display/change manager 452 may build a third buffer ("order summary window") which includes any of the order details, changed order details, and suitable user interface elements to allow the user to provide and/or change changed order details and/or cancel changed order details described herein. In one embodiment, order details display/change manager 452 builds the order summary window and instructs the operating system (not shown) to display such order summary window via a new window on top of the current window and buffer displayed. In one embodiment, order details display/change manager 452 may cause the order summary window to be displayed temporarily, and if the user clicks the confirmation button or the cancel button provided with the order summary window, the indicated action may be executed according to the user's click as described above and in more detail below, and order details display/change manager 452 may cause the temporarily displayed order summary window to no longer be displayed.

As noted above and described herein, input manager 450 receives and identifies any input information provided by the user via the operating system (not shown) of the user's client device 401, using the location coordinates received corresponding to the input information and any of the display tables corresponding to panels of the display, and input manager 450 may signal one or more appropriate elements with the user action and location coordinates information to process the received input as described herein.

If the user clicks or taps the user interface control to confirm or cancel the changed order details, as described above, then order detail display/change manager 452 receives such click (via input manager 450). If order details display/change manager 452 receives a click on the user interface control provided to cancel (or to not confirm) the changed order details corresponding to the new location of the order icon displayed, then no order changes are implemented or executed on behalf of the user, and order details display/change manager 452 may cause the order summary window to no longer be displayed.

If order details display/change manager 452 receives a click on such confirmation button provided, then order details display/change manager 452 also receives any additional changes to changed order details corresponding to the confirmation button clicked, including order detail values manually entered or selected by the user, as well as any pre-filled values displayed to the user and left unchanged by the user. Order details display/change manager 452 stores such information received in the action object received, along with an indication that the changed order details have been confirmed, and the date and time when such confirmation was received ("user confirmation date and time"). Order details display/change manager 452 sends the action object to change location manager 458 in response to the request for confirmation it received from change location manager 458.

Change location manager 458 receives the action object from order details display/change manager 452 in response to its request for confirmation, including the action serial number, the order serial number corresponding to the relocated open order icon, any changed order details corresponding to the new location of the order icon which have been confirmed by the user, and user confirmation date and time. In one embodiment, change location manager 458 provides the received action object to cancelation manager 460 and stores the changed order details included in the action object in client account storage 412 as new user order details associated with action serial number and user confirmation date and time included in the action object.

Cancelation manager 460 receives the action object from change location manager 458, and cancelation manager 460 cancels or unwinds order details in client account storage 412 corresponding to the order serial number included in the received action object. In one embodiment, cancelation manager 460 identifies the order type associated with the received order serial number in client account storage 412. If the order type corresponding to the order serial number included in the action object is a limit type order in client account storage 412, then cancelation manager 460 causes such limit order to be canceled. To cause the limit order to be canceled, cancelation manager 460 may mark such order as canceled in client account storage 412 along with the action serial number and user confirmation date and time included in the action object, and cancelation manager 460 signals client communication manager 416 with the action serial included in the action object in the manner of signaling client communication manager 416 described herein.

If the order type corresponding to the order serial number included in the action object is an option type order in client account storage 412, then cancelation manager 460 may cause such option order to be canceled by purchasing or selling an option order to unwind the canceled option order as described above. To cause the option order corresponding to the order serial number included in the received action object to be canceled, cancelation manager 460 may cause an option order which is equivalent to the option order canceled by the user to be purchased or sold on behalf of the user based on whether the canceled option order is one that was purchased by the user or an option sold by the user. In one embodiment, an equivalent option corresponding to a canceled option order is an option which is of the same option type as the canceled option order (e.g. call or put), and also specifies the same security, number of shares, strike price, and expiration date as the canceled option order. For example, if the canceled option order is a call option previously purchased by the user which allows the purchaser of the option order to purchase 100 shares of Security X at a strike price of two dollars per share, then cancelation manager 460 may cause an equivalent call option to be sold on behalf of the user allowing the purchaser of the option order to purchase 100 shares of Security X at the same strike price and on the same expiration date corresponding to the call option previously purchased by the user.

If the canceled option order is an option order which the user has purchased, then an equivalent option order may be sold on behalf of the user using the user's associated brokerage account or accounts. For example, if the option order canceled by the user is a call option previously purchased by the user, then cancelation manager 460 may cause an equivalent call option to be sold on behalf of the user.

Similarly, if the canceled option order is an option order of which the user was the seller, then an equivalent option to the one previously sold is purchased on behalf of the user via the user's associated brokerage account or accounts.

Cancelation manager 460 identifies whether to purchase or sell an equivalent option order to cancel the option order corresponding to the order serial number included in the action object, and cancelation manager 460 stores order details corresponding to such identified equivalent option order, including the type of option order (e.g. call option, put option), indication whether such option is a purchased option or sold option, specified security, specified number of shares, strike price, and expiration date, in client account storage 412 as new order details associated with the action serial number and user confirmation date and time included in the action object.

Client communication manager 416 receives the signal and action serial number from cancelation manager 460, and client communication manager 416 identifies any order information associated with the received action serial number in client account storage 412, including any order details stored as new order details, as well as any order details marked as canceled. In one embodiment, client communication manager 416 provides such identified order information associated with the action serial number to server communication manager 402, including the user confirmation date and time stored corresponding to such order information.

In one embodiment, any time client communication manager 416 receives a signal and an action serial number corresponding to new, changed, or canceled order information, which has been stored in client account storage 412 as described herein, client communication manager 416 identifies such order information and provides it to server communication manager 402, along with the action serial number corresponding to such information, in the manner of providing information to server communication manager 402 described above.

Server communication manager 402 receives the action serial number and new order details as described above, and server communication manager 402 stores order information corresponding to each new order and/or order cancelation corresponding to the action serial number it received in server account storage 404 associated with such action serial number. In one embodiment, if server communication manager 402 stores any new order information in server account storage 404, it stores such new order details associated with a unique order serial number that server communication manager 402 assigns, and server communication manager 402 provides such order serial number to client communication manager 416 in response to the action serial number and order details received, and client communication manager 416, in the manner described herein, receives the order serial number and stores it, as well as any other information it may receive, in client account storage 412 associated with the order details for which such assigned order serial number is received.

If the user drags an order icon from the open order graph into the column displaying expired order icons as described above, then input manager 450 identifies the order serial number corresponding to the dragged order icon, as well as the location coordinates corresponding to the ending location of the dragged order icon, and input manager 450 builds and provides to cancelation manager 460 an action object including an action serial number, and the starting location coordinates, order serial number, and ending location coordinates corresponding to the user action received. In one embodiment, input manager 450 may identify the location coordinates corresponding to the ending location of the dragged order icon as coordinates included in the display of the column displaying icons for expired, canceled, and/or closed orders, as described above.

Cancelation manager 460 receives the action object from input manager 450, and cancelation manager 460 identifies the order and/or order type corresponding to the order serial number included in the action object in client account storage 412. If cancelation manager 460 identifies the order corresponding to the included order serial number as a limit order, then cancelation manager 460 adds an indication of such to the action object it received, along with an indication that the order corresponding to the included order serial number may be canceled, and cancelation manager 460 provides the action object to order detail/display change manager 452 with a signal to receive confirmation from the user to cancel the order corresponding to the order serial number included in the action object.

Order detail display/change manager 452 receives the action object and signal from cancelation manager 460, and order detail display/change manager 452 displays order details corresponding to the order serial number included in the action object as described above. In one embodiment, order detail display/change manager 452 displays order details corresponding to the order serial number of the order that is to be canceled in a manner similar to the manner in which it displays order details corresponding to a relocated order icon, using the order summary window described above, and order detail display/change manager 452 also similarly displays user interface controls to confirm or not confirm the cancelation of the order for which order details are displayed in the order summary window, and confirmation to cancel such order may be received or not received from the user as described above. If order detail display/change manager 452 receives confirmation from the user to cancel the order for which details are displayed via the order summary window, such as a click on the confirmation button provided (via input manager 450), order detail display/change manager 452 stores an indication that such confirmation is received in the action object, along with the user confirmation date and time when such confirmation was received, and order detail display/change manager 452 returns the action object to cancelation manager 460 in response to the request for confirmation.

In one embodiment, if confirmation is not received from the user via the confirmation button provided, then order detail display/change manager 460 may signal cancelation manager 460 that confirmation is not received, or order detail display/change manager 452 may discard the action object.

If cancelation manager 460 receives the action object from order detail display/change manager 452 with the indication that confirmation corresponding to the cancelation of the order corresponding to the order serial number included in the action object is received from the user, then cancelation manager 460 may mark the order as canceled in client account storage 412. In one embodiment, cancelation manager 460 signals client communication manager 416 as described herein to cancel the order in server account storage 402 and client communication manager 420 complies as described herein.

In one embodiment, the user may also select and drag an available order icon added to the display, such as by search manager 454 or positions manager 456, as described above. If the user drags an available order button or icon displayed on the available orders panel onto the open order graph as described above, then input manager 450 receives the user action and identifies the available order icon corresponding to the initial location of the received user action and the ending location coordinate of the user action. In one embodiment, input manager 450 identifies available order details, including an order type (e.g. market, limit, put option, call option), a specified security, and an indication whether shares of such specified security are to be purchased or sold, as described above, corresponding to the available order button displayed at the beginning location coordinates of the received user action via the search display table or available orders table provided by either search manager 454 or positions manager 456, respectively.

In one embodiment, if input manager 450 identifies the starting location of the received user action as coordinates corresponding to an available order button, and identifies the ending location coordinates of the received user action as coordinates included within the open order graph, input manager 450 builds an action object including an action serial number, any available order details corresponding to the available order button displayed at the starting location coordinates received, and the ending location coordinates of the user action received, and input manager 450 provides the action object to drag on manager 462.

Drag on manager 462 receives the action object from input manager 450. Using any available order details included in the action object, as well as the ending location coordinates included in the action object, drag on manager 462 may identify any number of pre-fill values or additional order details corresponding to the available order details already included in the received action object. For example, if the order type of the available order details included in the action object is a market type order, drag on manager 462 may identify the market price most recently stored in client account storage 412 corresponding to the specified security included in the action object, and drag on manager 462 may add the identified market price to the action object.

If the order type included in the action object corresponds to a limit order, drag on manager 462 may identify pre-fill values for the strike price and expiration date corresponding to the available order details included in the action object and add such pre-fill values as such to the action object. In one embodiment, drag on manager 462 may identify the market price most recently stored in client account storage 412 corresponding to the specified security included in the action object, and drag on manager 462 may use such market price identified and the ending location coordinates included in the action object (i.e. coordinates corresponding to the open order graph) to identify pre-fill values for the strike price and expiration date details corresponding to action object received.

If the order type included in the action object corresponds to an option order, then drag on manager 462 may signal client communication manager 416 to request available option orders information corresponding to the specified security included in the action object. Client communication manager 416 receives any such request as described above and requests and receives the option orders information corresponding to the specified security, and client communication manager 416 stores the received option orders information in client account storage 412 associated with the specified security and the date and time such information was requested and received. In one embodiment, client communication manager 416 may signal drag on manager 462 that such information has been recently stored.

When drag on manager 462 receives the signal from client communication manager 416 that available option orders information has been recently stored, drag on manager 462 may retrieve such recently stored information from client account storage 416 and identify pre-fill values for the strike price and expiration date corresponding to the ending location coordinates received in the action object. Drag on manager 462 adds the pre-fill strike price and pre-fill expiration date to the action object, along with an indication that the action object corresponds to an available securities order placed by the user, and drag on manager 462 provides the action object to order details display/change manager 452 along with a signal to confirm with the user the new securities order included in the action object as described above.

Order details display/change manager 452 receives the action object and signal from drag on manager 462, and order details display/change manager 452 displays the market price of the specified security and available order details, including any pre-fill values included in the action object, along with one or more suitable user interface controls to allow the user to confirm or not confirm the order details corresponding to the new securities order as described above, in a manner similar to the manner in which order details display/change manager 452 displays to the user any order details and other information corresponding to a relocated option order icon above. In one embodiment, order details display/change manager 452 receives any input provided by the user via input manager 450.

If order details display/change manager 452 receives confirmation from the user to place the new securities order, such as in the manner described herein for receiving any user confirmation, then order details display/change manager 452 adds an indication that such confirmation has been received, the user confirmation date and time, and also adds any order details changes received from the user as described above, if the user provided any such changes along with the confirmation, and order details display/change manager 452 provides the action object to drag on manager 462 in response to its request for user confirmation.

Drag on manager 462 receives the action object from order details display/change manager 452, including the user confirmation date and time and order details confirmed by the user, and drag on manager 462 stores the confirmed order details included in the action object in client account storage 412 and signals client communication manager 416 in the manner described herein, and client communication manager 416 provides the information stored by drag on manager 462 to server communication manager 402 (along with the session identifier in client account storage 412, as described above). Server communication manager 402 receives the confirmed order details and session identifier from client communication manager 416, and server communication manager stores the received information in server account storage 402 associated with the user identifier and brokerage account or accounts corresponding to the received session identifier, and a unique order serial number it assigns to such confirmed order details. In one embodiment, server communication manager 402 provides the order serial number it assigns to client communication manager 416 in response to such confirmed order details it received, and client communication manager 416 receives such order serial number and stores it in client account storage 412 associated with the confirmed order details it provided to server communication manager 402.

If the user drags an open order icon displayed on the open order graph over the x-axis of the open order graph as described above, then input manager 450 identifies the user action as described above, builds an action object as described above, and provides the action object, including the action serial number, beginning location coordinates of the user action, ending location coordinates of the user action, and order serial number corresponding to the beginning location coordinates to marked order conversion manager 466. Market order conversion manager 466 receives the action object from input manager 450, and market order conversion manager 466 identifies limit order details in client account storage 412 corresponding to the order serial number received in the action object and causes such limit order to be converted to an open market order as described above. In one embodiment, to cause a limit order to be converted to a market order as described above, market order conversion manager 466 identifies the security and amount of shares specified by the limit order details corresponding to the order serial number included in the action object in client account storage 412, as well as the current market price of such specified security in client account storage 412. In one embodiment, market order conversion manager 466 adds such specified security, specified amount of shares, and current market price of the specified security to the action object as pre-fill values for the specified security, number of shares, and market price corresponding to a market order, along with an indication that such pre-fill order details correspond to a limit order being converted to an open market order, and market order conversion manager 466 provides the action object to order detail display/change manager 452 along with a signal to request confirmation from the user to convert the limit order to an open market order as described above.

Order details display/change manager 452 receives the action object from market order conversion manager 466 and displays, via the new window in the manner described above, the pre-fill order details included in the action object, including the security and amount of shares specified corresponding to the new market order, the current market price of such security specified, and the user interface controls to confirm or not confirm converting the limit order to a market order as described above. Via input manager 450 as described above, order details display/change manager 452 receives any input provided by the user.

If the user confirms converting the limit order to a market order by clicking the confirmation user interface control provided by order details display/change manager 452 as described above, order details display/change manager 452 receives the user confirmation to convert the limit order to a market order and adds an indication that user confirmation has been received to the received action object, as well as the date and time when such confirmation was received. In one embodiment, order details display/change manager 452 may also add any changes received from the user for any order details corresponding to the new securities order, if the user provided any such changes along with the confirmation, and order details display/change manager 452 sends the action object to market order conversion manager 466 in response to the request for confirmation that order details display/change manager 452 received.

Market order conversion manager 466 receives the action object from order details display/change manager 452, including the order serial number corresponding to the limit order being converted to a market order, market order details, and date and time that user confirmation was received to convert the limit order to a market order, and market order conversion manager 466 stores such market order details in client account storage 412 as a new user order, and market order conversion manager 466 signals client communication manager 416 to provide such market order details to server communication manager 402 as described above.

Additionally, market order conversion manager 466 marks the order serial number included in the action object, which corresponds to the limit order which has been converted to a market order on behalf of the user, as converted in client account storage 412, or market order conversion manager 466 may mark such order serial number as canceled in client account storage 412, along with the date and time when such limit order was converted in the manner described herein. In one embodiment, market order conversion manager 466 signals client communication manager 416 to provide the order serial number corresponding to the converted limit order to server communication manager 402, as described above along with an indication to cancel such limit order. Client communication manager 416 and server communication manager 402 (and order execution manager 434) each comply as described herein.

If the user drags an open order icon from the open order graph into the after hours market column as described above, then input manager 450 receives and identifies such user action, builds an action object corresponding to the user action identified, and provides the action object to after market add manager 468. In one embodiment, input manager 450 may identify the ending location of the user's action as the area of the display corresponding to the after hours market column, and input manager 450 may identify the order serial number corresponding to the order icon displayed at the initial display location of the user's action using the active icon display table provided by active icon assignment manager 442. Input manager 450 builds the action object to include an action serial number and the order serial number identified corresponding to the initial display location of the user's action.

After market add manager 468 receives the action object from input manager 450, and after market add manager 468 provides the action object to order details display change manager 452 along with an indication to receive confirmation from the user to allow the order corresponding to the order serial number included in the action object to be traded in the extended hours market as described above. In one embodiment, after market add manager 468 adds a pre-fill value to the action object corresponding to the indication whether an order is permitted or not permitted to be traded after hours. After market add manager 468 may add such pre-fill value as "permitted" and provide the action object to order details display/change manager 452.

Order details display/change manager 452 receives the order object from after market add manager 468, identifies in client account storage 412 the order details associated with the order serial number included in the action object, provides the display of such order details, as well as any pre-fill values added in the action object, to the user in the manner described herein, and also provides the user interface elements to allow the user to confirm or not confirm allowing the user's order to be traded during the extended hours market as described above. If the user provides the requested confirmation, such as by clicking the user interface control provided by order details display/change manager 452, order details display/change manager 452 receives such confirmation and adds the confirmation received to the action object with the date and time when such user confirmation is received. In one embodiment, order details display/change manager 452 provides the action object to after market add manager 468, including the user confirmation date and time, and after market add manager 468 receives the action object.

After market add manager 468 stores the indication to allow the user order in client account storage 412 corresponding to the order serial number included in the action object to be executed after hours as described above. In one embodiment, after market add manager 468 signals client communication manager 416, and client communication manager 416 receives the signal and relays the information updated in client account storage 412 by after market add manager 468 to server communication manager 402 as described herein.

If the user drags an order icon displayed in the after hours market column out of the after hours market column as described above, input manager 450 receives the user's action (via the operating system, not shown), identifies the order serial number corresponding to the initial location of the user's action via the after market display table provided by after market icon manager 446, and builds an action object including an action serial number and the order serial number identified corresponding to the initial location of the user's action. In one embodiment, input manage 450 provides the action object to after market cancel manager 470, which receives it and provides the action object to order details display/change manager 452 along with a request to receive confirmation from the user as described herein. In one embodiment, after market cancel manager 470 adds an indication of "not permitted" to the action object as a pre-fill value for whether an order may be traded after hours, as described above, and provides the action object to order details display/change manager 452. Order details display/change manager 452 receives the action object, and displays to the user order details corresponding to the order serial number included in the action object, and any pre-fill value added to the action object by after market cancel manager 470 in the manner described herein.

Order details display/change manager 452 identifies in client account storage 412 the order details associated with the order serial number included in the action object, and provides the display of such order details, as well as any pre-fill values added in the action object, to the user in the manner described herein. Order details display/change manager 452 also provides the user interface elements to allow the user to confirm or not confirm disallowing the user's order to be traded during the extended hours market as described above. If the user provides the requested confirmation, such as by clicking the user interface control provided by order details display/change manager 452, order details display/change manager 452 receives such confirmation, adds the confirmation received to the action object with the date and time when such user confirmation is received, and provides the action object to after market add manager 468.

After market add manager 468 receives the action object. After market add manager 468 stores the indication to disallow the user order in client account storage 412 corresponding to the order serial number included in the action object to be executed after hours. As described herein, after market add manager 468 signals client communication manager, and client communication manager 416 receives the signal and relays the information updated in client account storage 412 by after market add manager 468 to server communication manager 402 as described herein.

If the user requests to change the size of an open order, or the number of security shares corresponding to any open securities order, such as by clicking and dragging an edge of the displayed order icon corresponding to such order to make the icon bigger or smaller, or using a two-finger motion to zoom in or zoom out on such order icon displayed, or in any other manner of requesting to change the size of the order as described above, input manager 450 receives the user action via the operating system (not shown), identifies the order serial number corresponding to the user's action via the active icon display table provided by active icon assignment manager 442, and provides the action object including the action serial number and order serial number identified corresponding to the user's action to order size change manager 472.

Order size change manager 472 receives the action object from input manager 450. In one embodiment, order size change manager 450 identifies order details in client account storage 412 corresponding to the order serial number included in the received action object, including the number of security shares specified corresponding to such order serial number, and order size change manager 472 may identify a pre-fill value for a number of security shares corresponding to the user action received in the action object and add such pre-fill value to the action object. In one embodiment, order size change manager 472 may identify the magnitude of the user action included in the action object, such as the amount by which the user increases or decreases the size of the order icon, using the initial and ending location coordinates included in the action object. Order size change manager 472 adds any pre-fill values identified to the action object received and provides the action object to order details display/change manager 452 along with an indication to receive confirmation from the user to change the size of the user's securities order as described above.

Order details display/change manager 452 receives the action object from order size change manager 472, displays (via the new window in the manner described above) order details corresponding to the order serial number included in the action object and any pre-fill values included in the action object in the manner described above, along with the user interface control to confirm or not confirm such pre-fill values and/or any other order details that the user may provide and order details display/change manager 452 may receive, as described above.

If the user confirms changing the size of the order by clicking the confirmation user interface control provided by order details display/change manager 452 as described above, order details display/change manager 452 receives the user's confirmation and adds an indication that such confirmation has been received to the received action object, as well as the date and time when such confirmation was received from the user. In one embodiment, order details display/change manager 452 may also add any changes received from the user for any order details corresponding to the new securities order, if the user provided any such changes along with the confirmation, and order details display/change manager 452 provides the action object to order size change manager 472 in response to its request for user confirmation.

Order size change manager 472 receives the action object from order details display/change manager 452, including the order serial number corresponding to the order for which the size of the order is changed, order details including the new number of security shares specified by the user's order, and the indication that user confirmation was received corresponding to changing the size of the order, and order size change manager 472 stores the confirmed order details included in the action object in client account storage 412 as a new user order. Additionally, order size change manager 472 marks the order serial number included in the action object it received, which corresponds to the user order for which the size of such order has been changed by the user, as changed in client account storage 412, or order size change manager 472 may mark such order serial number as canceled in client account storage 412, along with the date and time when the size of such order was changed in the manner described herein.

In one embodiment, order size change manager 472 signals client communication manager 416 to provide any information it has stored in client account storage 412 to server communication manager 402, as described above. Client communication manager 416 and server communication manager 402 each receives any signals and/or information provided to it, and each complies with such received signals as described herein. Client communication manager 416 receives in response an order serial number corresponding to the confirmed order details it provided to server communication manager 402 and stores such order serial number received in client account storage 412 associated with such order details as described herein.

The user may request to view a replay of the display of order icons over a replay time period, as described above, by selecting such replay time period and clicking or tapping a replay user interface control provided by client replay manager 480. In one embodiment, the user may select the replay time period from a drop down menu, or via one or more checkboxes, or in any other manner, and such replay time period may specify a replay start time and a replay end time as described above, or it may specify a pre-defined time interval, such as "past 24 hours", or "past three days", etc. If the user selects a replay time period and requests to view a replay as described above, client replay manager 480 receives such request and replay time period (via input manager 450), and client replay manager 480 signals client communication manager 416 to retrieve user order history and historical quotation data corresponding to the requested replay time period. In one embodiment, client replay manager 480 stores the requested replay time period in client quotation storage 415 along with the date and time such replay is requested.

Client communication manager 416 receives the signal and requested replay time period from client replay manager 480 and signals server communication manager 402 in the manner described above with the request and requested replay time period. In one embodiment, server communication manager 402 receives the request and replay time period and provides such received information to server replay manager 482.

Server replay manager 482 receives the request and requested replay time period, and server replay manager 482 identifies any order information in server account storage 404 corresponding to user orders which may have been added, changed, executed, expired, and/or canceled as described above during the requested replay time period, and server replay manager 482 also identifies historical quotation data in server quotation storage 406 corresponding to any securities, or ticker symbols, specified in any user orders which were open at any time during such requested replay time period. In one embodiment, server replay manager 482 identifies historical quotation data corresponding to each of N date/times, identified as described above based on the received replay time period, for such ticker symbol or symbols, and server replay manager 482 provides an order information identified from server account storage 404 and any historical quotation data identified from server quotation storage 406 to server communication manager 402 as signaled.

Server communication manager 402 forwards the information identified by server replay manager 482 to client communication manager 416, which receives it, and stores such received information in client quotation storage 415 associated with the replay time period for which such information was requested. In one embodiment, client communication manager 416 signals client replay manager 480 when such information corresponding to the requested replay time period has been stored.

Client replay manager 480 receives the signal from client communication manager 416, and client replay manager 480 selects the first date/time corresponding to the requested replay time period from client quotation storage 415, and client replay manager 480 displays a re-display of order icons corresponding to any orders for which, at the date and time of the selected date/time, order icons were displayed, including on the open order graph, executed/expired orders column, and after hours market column, as described above.

In one embodiment, client replay manager 480 displays the requested replay via a pop-up window or other replay display window, and client replay manager 480 also displays any number of suitable user interface elements to allow the user to pause the requested replay, go back in the requested replay, and go forward in the requested replay, as described above.

To display the re-display of order icons corresponding to the selected date/time, in one embodiment, client replay manager 480 signals order selection manager 422, along with the selected date/time, to create the display of order icons on the inactive display buffer in a manner similar to the manner in which order selection manager 422 builds the display of the open order graph, executed/expired orders column, and optional after-hours market column, if applicable, as described above with respect to FIG. 2A, and order selection manager 422 receives such signal and selected date/time, and order selection manager 422 complies as described above. In one embodiment, order selection manager 422 identifies whether the selected date/time is a date and time at which the after-hours market column would be displayed, and initializes the re-display of display panels in a manner similar to the manner described above, based on such identification. Order selection manager 422 identifies in client quotation storage 415 any orders which were open orders at the date and time of the selected date/time, and identifies any historical quotation data in client quotation storage 415 corresponding to any such identified orders to cause an order icon to be displayed corresponding to each of such identified orders in its position on the open order graph of the selected date/time. In one embodiment, order selection manager 422 also identifies in client quotation storage 415 any orders which were executed, closed, expired, and/or canceled most recently at the selected date/time, and order selection manager 422 causes an order icon corresponding to each of such identified orders to be added to the re-display in the manner described above. In one embodiment, if the selected date/time is a date and time when the after-hours market column would be displayed, then order selection manager 422 may also cause the display of such column at the selected date/time to be added to the re-display corresponding to the selected date/time in a manner similar to the manner in which it causes the after-hours market column to be displayed above.

What is claimed is:

1. A computer-implemented method for placing and displaying orders for securities of companies comprising:

placing, via at least one stock market computer system, an order for a first security of a first company;

displaying an icon representing the order placed for the first security on a graphical display along with an icon for at least one order similarly placed for a security of at least one second company different from the first company, each of the icons in the graphical display having a position along an x-axis of an x-y coordinate graph responsive to an amount of time until its corresponding security order expires relative to a current time, and having a position along a y-axis of the x-y coordinate graph responsive to a percentage calculated as a current market price of each security relative to the price of its corresponding order; and, subsequently displaying, at regular time intervals, each of the icons in an updated position different from the position in which each of the icons was previously displayed, responsive to an amount of time until each order expires relative to an updated current time, and responsive to an updated percentage calculated using an updated current market price of each security and the price of each corresponding order.

2. The method of claim 1, wherein the subsequent display of each icon is made using two colors in proportion, a first color responsive to a quantity of each corresponding order that has been filled, and a second color responsive to a remaining quantity of each corresponding order that has not yet been filled.

3. The method of claim 1, wherein each icon is displayed with a gradient of color surrounding each icon responsive to a volatility of the security for which the corresponding order was placed.

4. The method of claim 1, wherein each icon is displayed with a border color, responsive to the current market price of the security for which the order was placed, the price of the order and a threshold distance from a zero line on the y-axis of the x-y coordinate graph.

5. The method of claim 1, wherein each order for each security comprises an order for an option for each security.

6. A computer system for placing and displaying orders for securities of companies comprising a processor, a graphical display, a communication interface coupled to at least one stock market computer system via a network, nonvolatile storage, and programmed instructions configured to:

place, via at least one stock market computer system, an order for a first security of a first company display an icon representing the order placed for the first security on the graphical display along with an icon for at least one order similarly placed for a security of at least one second company different from the first company, each of the icons in the graphical display having a position along an x-axis of an x-y coordinate graph responsive to an amount of time until its corresponding security order expires relative to a current time, and having a position along a y-axis of the x-y coordinate graph responsive to a percentage calculated as a current market price of each security relative to the price of its corresponding order; and, subsequently display, at regular time intervals, each of the icons in an updated position different from the position in which each of the icons was previously displayed, responsive to an amount of time until each order expires relative to an updated current time, and responsive to an updated percentage calculated using an updated current market price of each security and the price of each corresponding order.

7. The computer system of claim 6, wherein the subsequent display of each icon is made using two colors in proportion, a first color responsive to a quantity of each corresponding order that has been filled, and a second color responsive to a remaining quantity of each corresponding order that has not yet been filled.

8. The computer system of claim 6, wherein each icon is displayed with a gradient of color surrounding each icon responsive to a volatility of the security for which the corresponding order was placed.

9. The computer system of claim 6, wherein each icon is displayed with a border color, responsive to the current market price of the security for which the order was placed, the price of the order and a threshold distance from a zero line on the y-axis of the x-y coordinate display.

10. The computer system of claim 6, wherein each order for each security comprises an order for an option for each security.

11. A computer program product comprising a nontransitory computer useable medium having computer readable program code embodied therein for placing and displaying orders for securities of companies, the computer program product comprising computer readable program code devices configured to cause a computer system to:
   place, via at least one stock market computer system, an order for a first security of a first company
   display an icon representing the order placed for the first security on a graphical display along with an icon for at least one order similarly placed for a security of at least one second company different from the first company, each of the icons in the graphical display having a position along an x-axis of an x-y coordinate graph responsive to an amount of time until its corresponding security order expires relative to a current time, and having a position along a y-axis of the x-y coordinate graph responsive to a percentage calculated as a current market price of each security relative to the price of its corresponding order; and,
   subsequently display, at regular time intervals, each of the icons in an updated position different from the position in which each of the icons was previously displayed, responsive to an amount of time until each order expires relative to an updated current time, and responsive to an updated percentage calculated using an updated current market price of each security and the price of each corresponding order.

12. The computer program product of claim 11, wherein the subsequent display of each icon is made using two colors in proportion, a first color responsive to a quantity of each corresponding order that has been filled, and a second color responsive to a remaining quantity of each corresponding order that has not yet been filled.

13. The computer program product of claim 11, wherein each icon is displayed with a gradient of color surrounding each icon responsive to a volatility of the security for which the corresponding order was placed.

14. The computer program product of claim 11, wherein each icon is displayed with a border color, responsive to the current market price of the security for which the order was placed, the price of the order and a threshold distance from a zero line on the y-axis of the x-y coordinate display.

15. The computer program product of claim 11, wherein each order for each security comprises an order for an option for each security.

* * * * *